United States Patent [19]

Takemura et al.

[11] Patent Number: 5,171,726

[45] Date of Patent: Dec. 15, 1992

[54] COMPOSITION FOR GAS PURIFICATION AND METHOD OF PREPARING SAME

[75] Inventors: Yozo Takemura, Tokyo; Tamio Noda, Tokai; Masaru Meguro, Tokai; Norio Mikami, Tokyo; Yoshikatsu Ikari, Abiko, all of Japan

[73] Assignee: Nippon Steel Corporation, Tokyo, Japan

[21] Appl. No.: 679,015

[22] PCT Filed: Oct. 31, 1989

[86] PCT No.: PCT/JP89/01124

§ 371 Date: Apr. 29, 1991

§ 102(e) Date: Apr. 29, 1991

[87] PCT Pub. No.: WO90/05021

PCT Pub. Date: May 17, 1990

[30] Foreign Application Priority Data

| Oct. 31, 1988 | [JP] | Japan | 63-273195 |
| May 31, 1989 | [JP] | Japan | 1-135999 |
| Jul. 17, 1989 | [JP] | Japan | 1-182579 |
| Jul. 26, 1989 | [JP] | Japan | 1-191543 |
| Aug. 16, 1989 | [JP] | Japan | 1-210018 |

[51] Int. Cl.⁵ ............................................. B01J 31/04
[52] U.S. Cl. ................................... 502/170; 502/401; 502/527
[58] Field of Search ........................ 502/401, 170, 527

[56] References Cited

U.S. PATENT DOCUMENTS

4,670,288 6/1987 Ikari et al. .......................... 427/4
4,745,129 5/1988 Ikari et al. ...................... 514/502

FOREIGN PATENT DOCUMENTS

55-54033 4/1980 Japan.
61-74640 4/1986 Japan.
63-1098 1/1988 Japan.

*Primary Examiner*—Patrick P. Garvin
*Assistant Examiner*—Brent M. Peebles
*Attorney, Agent, or Firm*—Wenderoth, Lind & Ponack

[57] ABSTRACT

A composition for gas purification, comprising a reaction product of at least one metal selected from the group consisting of iron, manganese, chromium, nickel, zinc, aluminum, copper, tin and cobalt, and alloys containing these metal elements, with at least one oxypolybasic acid, wherein the metal co-exists therein while in an unreacted state.

26 Claims, 23 Drawing Sheets

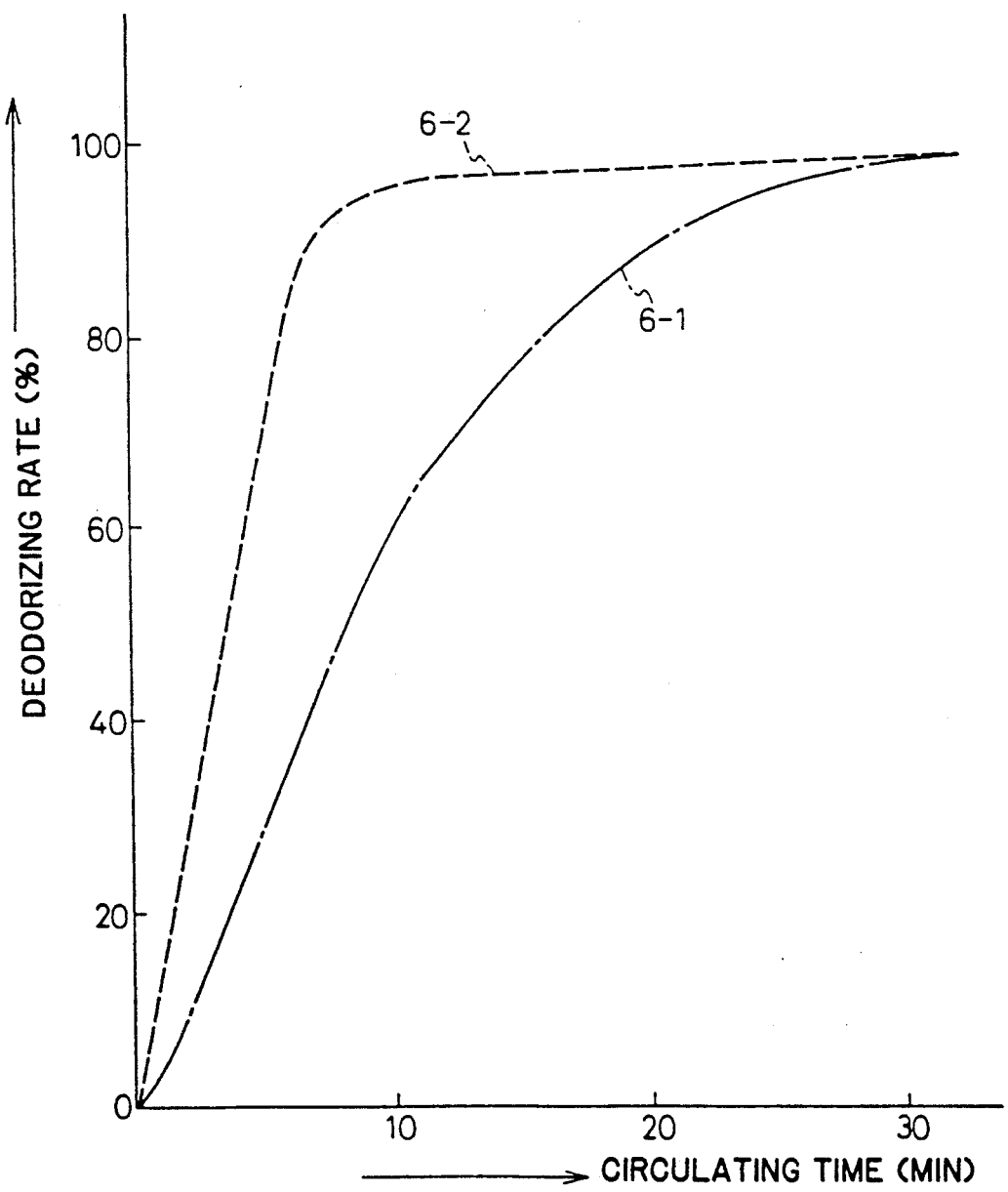

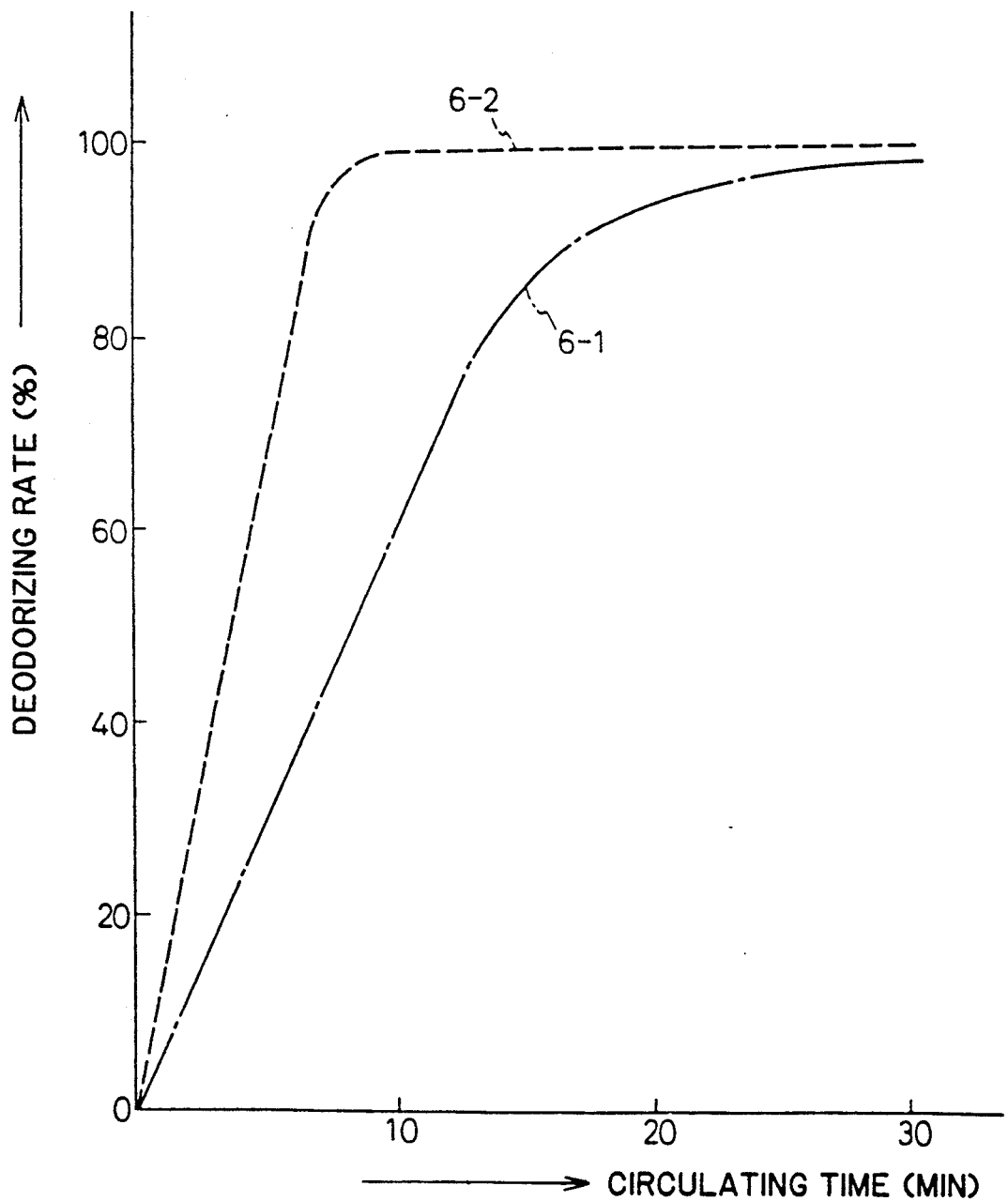

(×1000)

(TUBULAR SINTERED PRODUCT)

(SPHERICAL SINTERED PRODUCT)

(TUBULAR SINTERED PRODUCT)

(SPHERICAL SINTERED PRODUCT)

(×70)

(×70)

INTIMATE CONTACT   VOID 30  32

COMPOSITION FOR GAS PURIFICATION AND METHOD OF PREPARING SAME

TECHNICAL FIELD

The present invention relates to a composition for gas purification, which composition can be used as an air purification material for purifying polluted air containing harmful gases such as nitrogen oxides (NOx), sulfur oxides (SOx), and ozone ($O_3$) gas; and odorous gases including nitrogen compound type gases such as ammonia ($NH_3$); sulfur compound type gases such as hydrogen sulfide ($H_2S$); carboxylic group type gases such as acetaldehyde; and carboxylic acid (lower fatty acid) type gases such as acetic acid; or as a purification material for a combustion exhaust gas or harmful gas. The composition of the present invention also can be used as a food freshness retaining agent. The invention also relates to a method of preparing the composition.

BACKGROUND ART

The concentrations of NOx gases, SOx gases, and $O_3$ gas in the air must be lowered, and to prevent the generation of such gases, various combustion devices, gas purification devices, and chemical treatment devices are employed. Nevertheless, a method of efficiently removing these harmful gases with the use of simple equipment such as an air cleaner has not been generally realized.

Nitrogen compound type gases and sulfur compound type gases in the air are accompanied by objectionable odors, which are usually eliminated by the adsorption method using activated charcoal, a masking method using perfumes, and a chemical method in which a chemical reaction among the odorous gases is carried out. These deodorants of the prior art, however, have a problem in that the deodorizing ability thereof is lost within a short time.

Senigakkaishi (Seni to Kyoto) Vol. 42, No. 12 (1986), pages 18 to 26, states that a complex compound obtained by the reaction between an Fe (II) compound and ascorbic acid in the form of a solution is able to deodorize nitrogen compound type odorous gases. Nevertheless, to the knowledge of the present inventors, such a complex compound has a weak ability for deodorizing sulfur compound type odorous gases, and although nitrogen compound type odorous gases are deodorized by adsorption by the complex compound, the amount adsorbed is limited, and therefore, a problem arises in that the deodorizing ability is lost within a short time, and further, it can not be practically applied to a gas other than ammonia. Further, such a complex compound is powderized by distillation or vacuum drying, but the preparation steps are complicated and the cost is high, because such compounds as $FeSO_4$, $FeCl_2$, and $Fe(NO_3)_2$ are employed as the Fe (II) compound. The powdery form must be carried on, for example, zeolite, and the method of using the same is also complicated. Further, although the adsorption type or chemical reaction type purification agent of the prior art can remove a part of the gases (depending on molecular size or readiness of the reaction), it cannot remove other gases, and thus it becomes necessary to use a plurality of purification filters to separately remove the respective gases.

To purify air, there is a need to provide an air purification material which can remove harmful NOx gases, $SO_2$ gas and $O_3$ gas, and further can remove carboxylic group type gases, carboxylic acid type gases, nitrogen compound type gases, and sulfur compound type gases, which are accompanied by objectionable odors. Also, there is a need for the development of a purification material having a large absorption capacity when removing harmful gases contained in the exhausted gases of internal combustion engines, objectionable odors, and harmful gases generated by chemical plants, etc. In the present specification, the ability to remove all of these harmful gases and objectionable odors is hereinafter referred to as air purification power.

There is also a need to develop an air purification material which can exhibit a strong air purification power even when used over a long term.

Further, for example, an air purification material is needed which can remove harmful gases or objectionable odors without the need for complicated treatments such as distillation and vacuum drying, etc., and an air purification material which is not powdery is most preferable because it is easily handled.

DISCLOSURE OF THE INVENTION

An object of the present invention is to provide a composition for gas purification which can be used as an air purification material which solves the problems of the prior art and satisfies the respective requirements mentioned above.

Therefore, according to the present invention, there is provided a composition for gas purification comprising a reaction product of at least one metal selected from the group consisting of iron, manganese, chromium, nickel, zinc, aluminum, copper, tin and cobalt, and alloys containing these metal elements, with at least one oxypolybasic acid, wherein said metal is not completely reacted and remains while co-existing therein.

The present inventors further found that the composition of the present invention is excellent as a food freshness retaining agent, and thus the present invention provides a composition for gas purification which is not limited only to providing purified air.

BRIEF DESCRIPTION OF THE DRAWINGS

The present invention is now described in detail with reference to the accompanying drawings, wherein.

Figure 8:
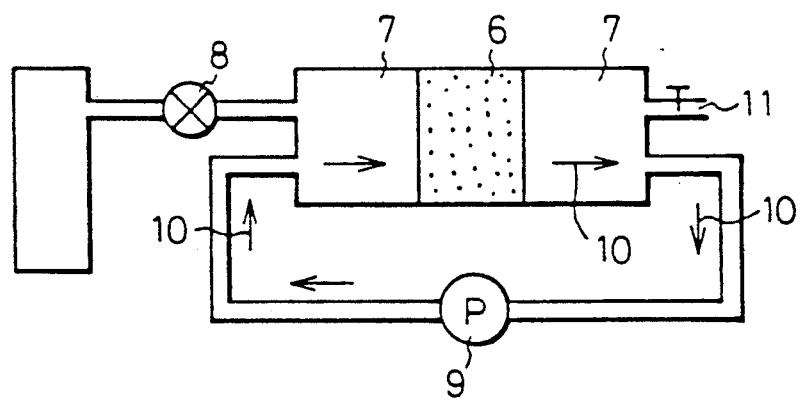
Figure 10A:
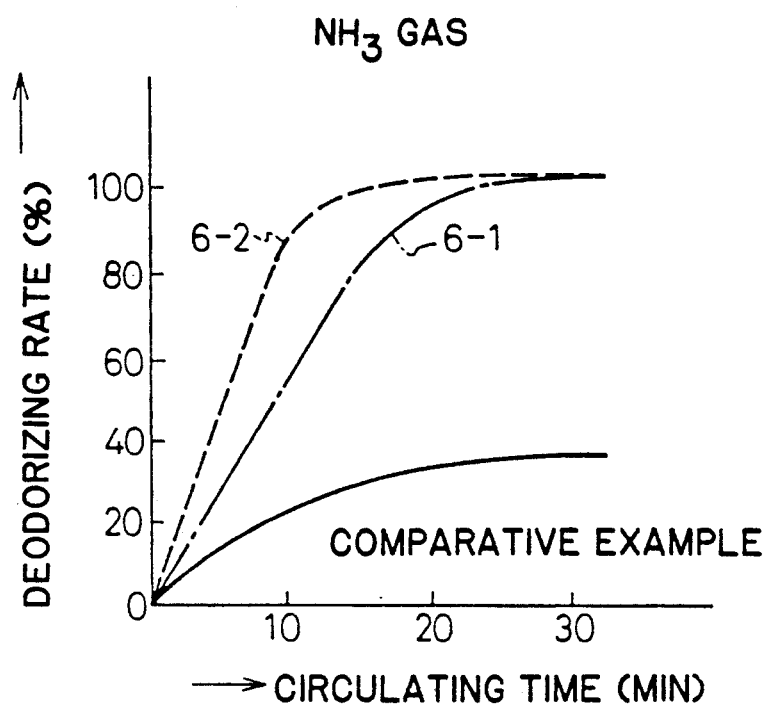
Figure 10B:
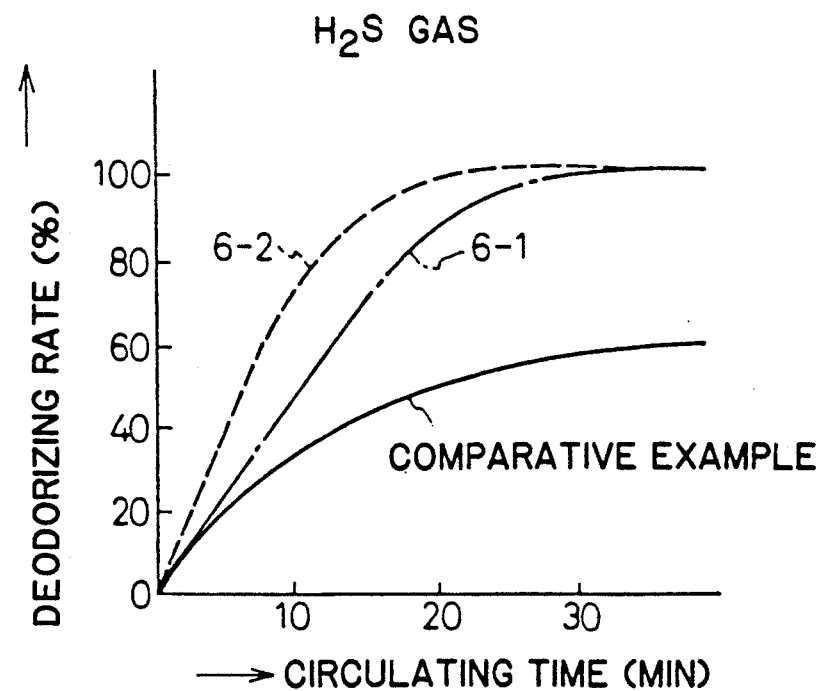
Figure 12A:
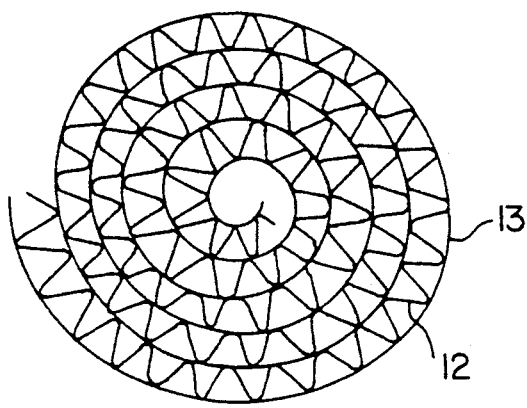
Figure 12B:
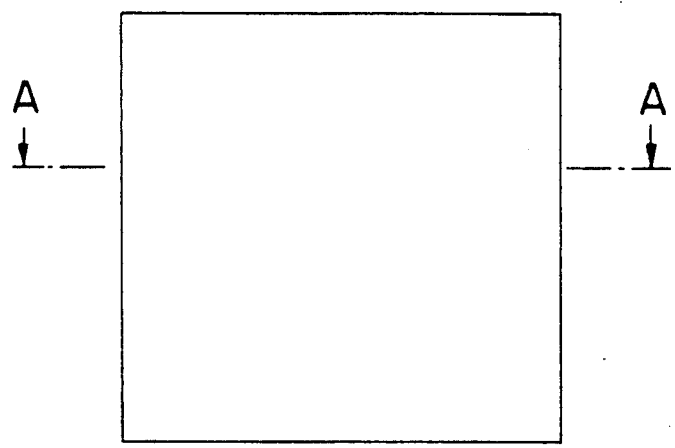
Figure 13:
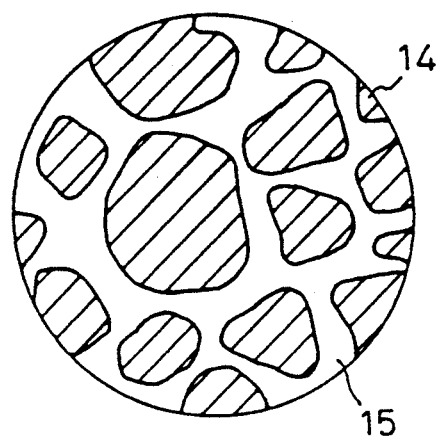
Figure 14:
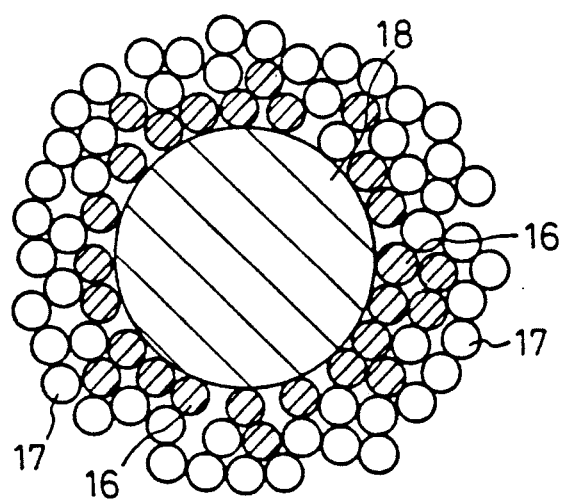
Figure 15:
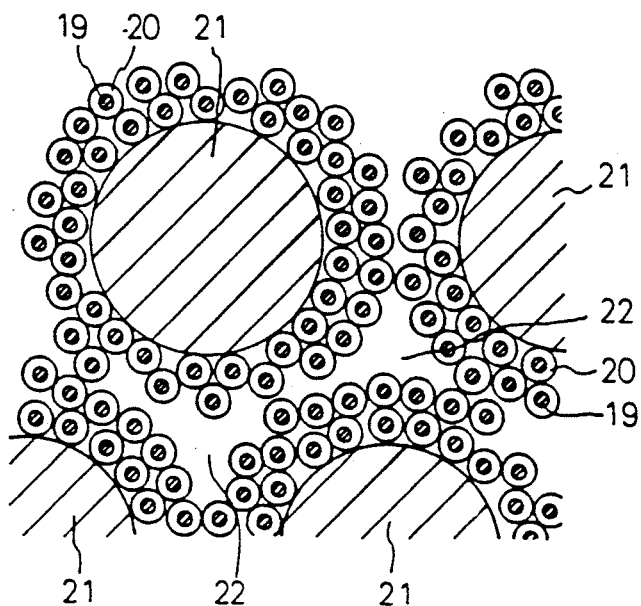
Figure 17:
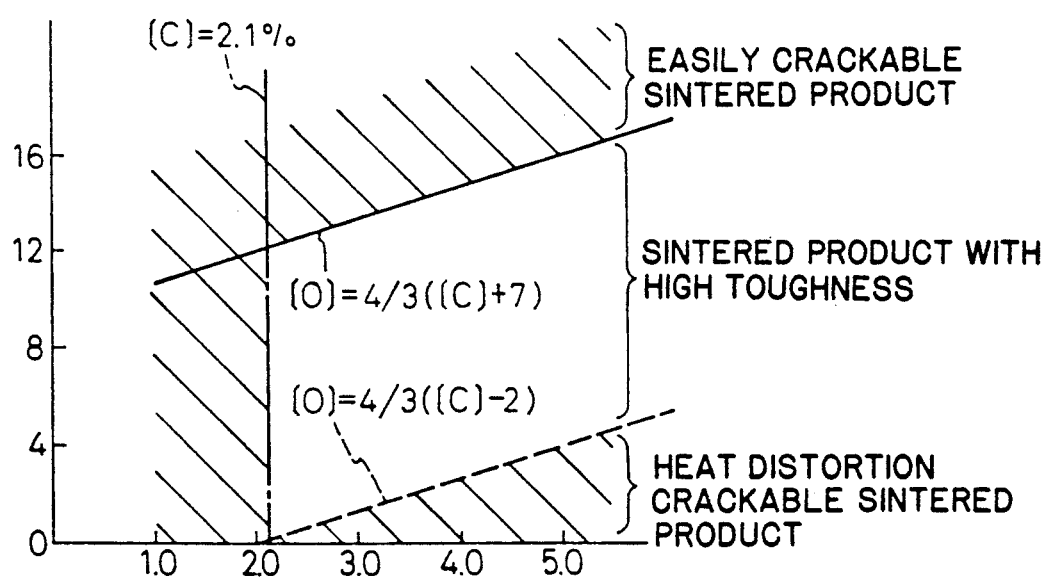
Figure 16:
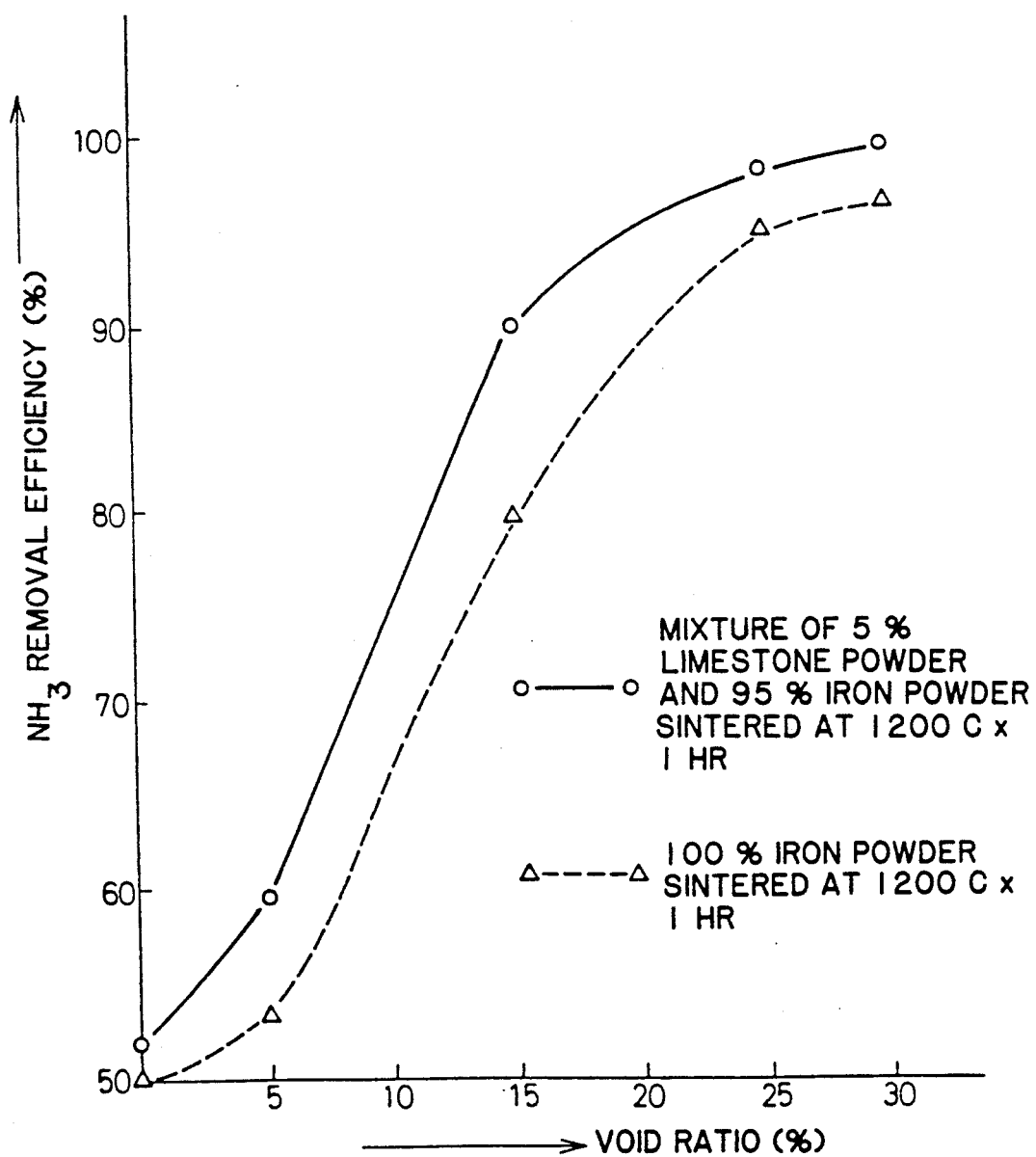
Figure 18A:
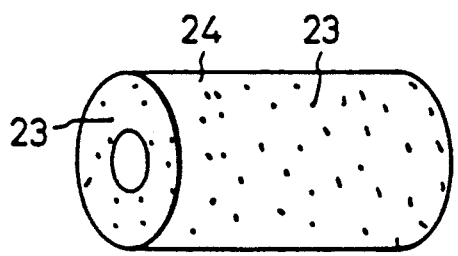
Figure 18B:
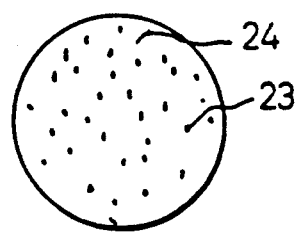
Figure 19A:
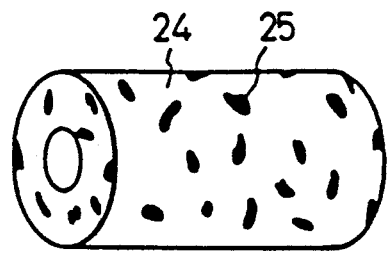
Figure 19B:
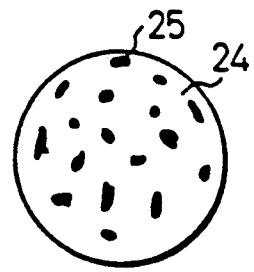
Figure 20:
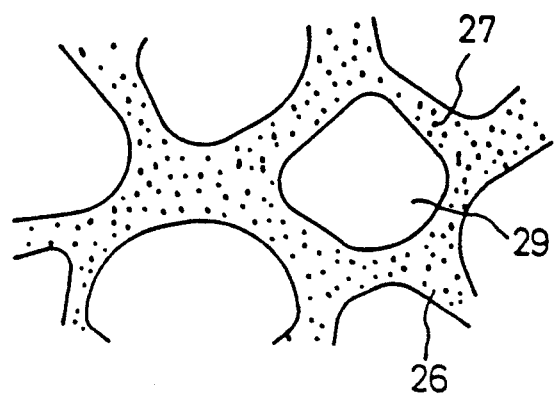
Figure 21:
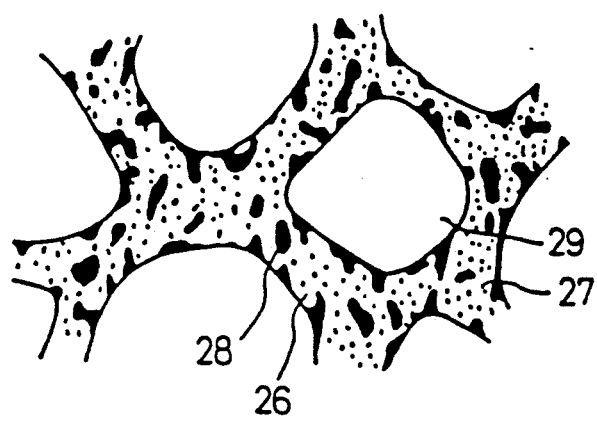
Figure 22:
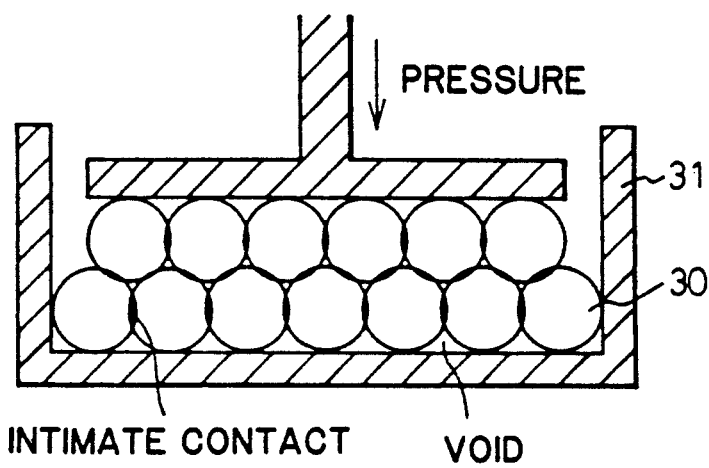
Figure 23:
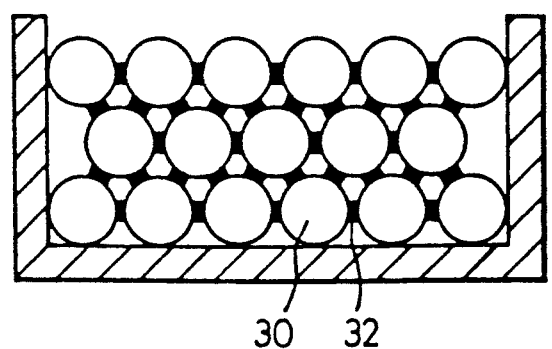

×300) of 10μ iron powder treated with L-ascorbic acid having a molar ratio of 0.2);

FIG. 8 shows an example of an air purification device equipped with a filter prepared from the composition of the present invention;

FIG. 9 (a) to (d) are graphs showing the treatment results of SO$_2$ (FIG. 9 (a)), NO$_2$ (FIG. 9 (b)), acetaldehyde (FIG. 9 (c)) and ozone (FIG. 9 (d)) in the air to be treated, with a lapse of time, when using the device shown in FIG. 8;

FIGS. 10 (a) and (b) show the deodorizing effects with a lapse of time when ammonia and hydrogen sulfide gas are deodorized by using the filters of an example of the present invention and of a comparative example;

FIGS. 11 (a) and (b) are graphs showing the regeneration effects of the filters used in FIGS. 10 (a) and (b);

FIGS. 12 (a) and (b) shows an example of the composition of the present invention prepared in the form of a honeycomb-shaped deodorizing cylinder, wherein FIG. 12 (a) is a sectional view along A—A in FIG. 12 (b);

FIG. 13 shows an example of the composition of the present invention when prepared in the form of a powder;

FIG. 14 shows an example of a spherical composition of the present invention prepared by using a binder;

FIG. 15 shows another example wherein the composition of the present invention is carried on organic polymer spheres;

FIG. 16 is a graph showing the relationship between the macrovoid ratio of the composition shaped as a sintered product according to the present invention, and the ammonia removal efficiency;

FIG. 17 shows the influence of the carbon content and the oxygen content in the powdery starting material on the properties of sintered product;

FIGS. 18 (a) and (b) show the surfaces of the tubular and spherical sintered products obtained by controlling the carbon content and the oxygen content as necessary;

FIGS. 19 (a) and (b) show the states when the surface areas shown in FIG. 18 (a) and (b) are further increased;

FIG. 20 and FIG. 21 are enlarged views of the appearance of the sintered porous body having three-dimensionally communicated pores according to the present invention; and FIG. 22 and FIG. 23 show other examples of preparing sintered products having three-dimensional pores according to the present invention.

BEST MODE OF CARRYING OUT THE INVENTION

The present inventors found that, when the reaction between iron and ascorbic acid is carried out without the use of Fe (II) compounds such as FeSO$_4$, FeCl$_2$ or Fe(NO$_3$)$_2$, and dried in the air, iron and ascorbic acid react with oxygen and moisture components in the air to give a reaction product having a strong gas or air purification power (hereinafter sometimes called air purification power) which can remove substantially all gases such as sulfur type compounds, nitrogen type compounds, lower fatty acids, SOx, NOx, and O$_3$. The inventors also found that, if an excessive amount of iron is used, such that unreacted iron remains, the iron and the above-mentioned reaction product co-exist, and consequently, the purification power of the reaction product is regenerated through the reaction of the oxygen and moisture components with iron, whereby a strong air purification power can be exhibited over a long term. Further, when a large number of acids similar to ascorbic acid, oxypolybasic acids, and acids having an OH group and COOH group are used, the effects of the purification power were different. Particularly, it was found that citric acid, tartaric acid and gluconic acid form reaction products having a strong air purification power similar to that of ascorbic acid. As oxypolybasic acids other than the above, which can be used in the present invention, for example, there are included malic acid, mannonic acid, xylonic acid, and tartaric acid. The above-mentioned ascorbic acid, citric acid, tartaric acid, gluconic acid, and other oxypolybasic acids may be used as a mixture of two or more kinds thereof, to give reaction products having a strong air purification power. (Hereinafter, in the present specification, one or a mixture of acids selected from ascorbic acid, citric acid, tartaric acid and gluconic acid may be sometimes referred to as "ascorbic acid, etc.".)

The present inventors further found that, when a reaction between manganese and ascorbic acid is carried out, in place of iron as the metal, a reaction product with an even stronger air purification power can be obtained. Particularly, by using manganese instead of iron, the deodorizing power with regard to hydrogen sulfide type odorous gases is markedly improved. When an alloy of iron and manganese is used, such as a mixture of iron particles and manganese particles, an improvement of air purification power corresponding to the manganese content is exhibited. In the present specification, although iron and manganese only are particularly disclosed any reference to other metals means alloys or mixtures thereof.

The present inventors made a further investigation by varying the kinds of metals, and as a result, it appears that the metals of Cr, Ni, Zn, Al, Cu, Sn, and Co have an air purification power, and further, a purification power regeneration effect with air. Note, Ni and Al are equal to Fe and Mn, but Cr, Zn, and others are slightly inferior thereto.

An example is shown in the following Table, in which the data was obtained by placing, in a 40-liter sealed box, 40 g of the co-existing product of the metal and the reaction product obtained by adding L-ascorbic acid to the respective metal powders having a size of 44μ at a molar ratio of 0.2, and kneading with water followed by drying, measuring the NH$_3$ removal ratio each time the initial NH$_3$ concentration became 2000 PPM, and thereafter, leaving the co-existing product of the metal and the reaction product of the metal with ascorbic acid to stand in the air for 10 hours and again performing similar tests, to investigate the activity regeneration effect of the co-existing product.

|  | After 5 minutes | After 10 minutes | After 20 minutes | After 30 minutes |
| --- | --- | --- | --- | --- |
| Ni after first | 76.8% | 89.1% | 97.5% | 98.4% |
| left to stand | 79.7% | 93.5% | 98.2% | 98.8% |
| Al after first | 82.6% | 93.5% | 98.2% | 99.0% |
| left to stand | 92.7% | 96.7% | 98.8% | 99.5% |
| Cr after first | 62.3% | 74.6% | 92.8% | 96.4% |
| left to stand | 41.3% | 49.3% | 63.0% | 72.5% |
| Zn after first | 85.5% | 90.2% | 93.1% | 95.7% |
| left to stand | 57.5% | 58.4% | 74.2% | 80.0% |
| Mn after first | 78.0% | 90.5% | 98.0% | 99.0% |
| left to stand | 80.0% | 94.0% | 98.5% | 99.8% |

The present invention has been accomplished on the basis of the findings mentioned above, and the composition for gas purification of the present invention is a composition containing a reaction product of one or two or more metals of Fe, Mn, Cr, Ni, Zn, Al, Cu, Sn and Co, and alloys thereof, with an oxypolybasic group, wherein unreacted metal remains therein while co-existing therewith.

The metal to be used in the present invention is not required to have a high purity, and metals containing usual impurities can be used. The composition of the present invention can be simply produced, because a complicated chemical engineering treatment such as distillation or vacuum drying is not required. In the present invention, if the metal is prepared in a shape that enables an easy practical purification operation, it is not required to be carried on zeolite, etc., and a composition having a shape enabling an easy use thereof can be formed.

The air purification action of the composition of the present invention is described as follows. In the present specification, the description is of iron and/or manganese as representative examples of the metal (iron and/or manganese are hereinafter abbreviated as iron, etc.), but other metals give the same or similar effects. If the base material is iron and, for example, manganese, is plated or flame sprayed thereon, iron coated with manganese is obtained, and according to the same method, manganese coated with iron can be produced. In the present specification, "iron, etc." includes these double-layer moldings of iron and manganese. As described later, the composition of the present invention is prepared by, for example, bringing iron, etc., into contact with ascorbic acid, etc., followed by drying. Due to this contact, the surface and crystal grain boundary of iron, etc., are subjected to corrosion or grain boundary corrosion by the ascorbic acid, etc., to thereby generate fine unevennesses that enlarge the surface area thereof. Further, with an elapse of time, the reaction proceeds and the number of cracks increases, thereby increasing the surface area of the iron, etc. The corroded surface is covered with the reaction product of iron, etc., and ascorbic acid, etc., (assumed to exist in the state where [OH] is coordination bonded to $Fe^{++}$ in a complex to form a chain).

Namely, the reaction product may be assumed to be as follows:

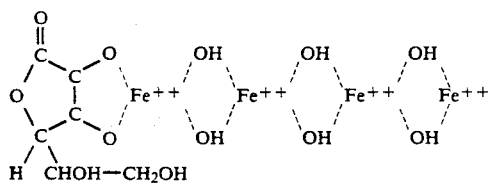

Figure 1A:
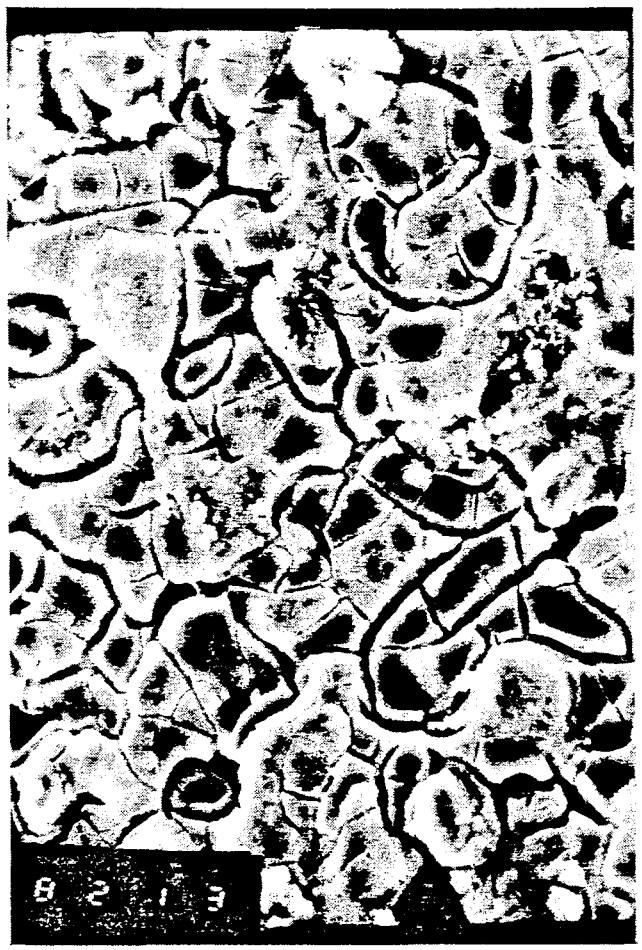
FIGS. 1 (a) and (b) are electron microscope photographs ($\times 1000$ magnification) of a metal structure comprising a reaction product of iron powder with ascorbic acid and iron powder.
Figure 1B:

FIGS. 1 (a) and (b) are photographs of the metal structure; FIG. 1 (a) is an electron microscope photograph (magnification: ×1000) showing the state after a treatment of 100μ iron powder with 2M L-ascorbic acid, followed by drying, and FIG. 1 (b) is a photograph (magnification: ×1000) showing the state after $NH_3$ gas absorption and leaving in the air have been repeated 40 times.

The composition of the present invention has a broad surface area between the iron, etc., and the reaction product, and therefore, the chemical reaction between the iron, etc. and the reaction product as described below proceeds smoothly. Further, the reaction product is inserted into the grain boundry, to thereby exhibit an anchoring effect, and the regeneration effect can be exhibited because the reaction product is kept in close contact with the iron, etc., and cannot be detached therefrom.

The present inventors estimate the gas purification mechanism of the air according to the present invention to be as described below.

(1) The nitrogen compound type gas (e.g. $NH_3$) is primarily bonded to the reaction product on the metal surface through a coordination to $Fe^{++}$ in the above-mentioned reaction product, to become an ammine complex.

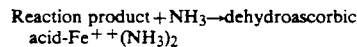

(2) Regarding the $NH_3$ adsorbed on the metal surface of the reaction product, with active iron existing immediately beneath the reaction product as the catalyst, the reaction of a part of $Fe(OH)_2$ in the complex and oxygen in the air with $NH_3$ in the ammine complex occurs as follows, to partially regenerate the reaction product:

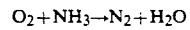

(3) The active iron works as a reducing agent in the presence of oxygen and moisture components in the air, whereby the cyclic mechanism of a redox of dehydroascorbic acid becomes valid.

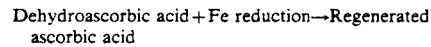

(4) The ascorbic acid as generated above reacts with iron and oxygen and moisture components in the air, and acts as an oxidizing agent such as NOx, $SO_x$, $O_3$, etc., to decompose harmful gases while forming a new reaction product, to thereby form active oxygen.

Regenerated ascorbic acid + oxidizing agent and moisture component → New reaction product + S and N + active oxygen (5) Carboxylic group type gases (e.g., acetaldehyde), $NH_3$, and $H_2S$ are oxidatively decomposed by this active oxygen.

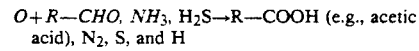

(6) The acetic acid formed as above (or other lower fatty acids) is fixed with a solid base.

(7) A part of $H_2S$ undergoes the following reactions, due to the catalytic reaction thereof with iron oxide in the presence of a solid base:

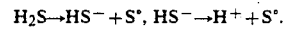

As long as metal iron precipitated by the decomposition exists, this regeneration mechanism remains valid, and ascorbic acid causes a corrosive reaction toward the central portion of the metal while persistently maintaining the purification effect, and thus it can be considered that corrosion cracking proceeds microscopically in the metal, to thereby increase the surface area of the reaction product, and thus the gas purification effect of air, etc., can persist over a long term.

Figure 2:
FIG. 2 is an electron microscope photograph ($\times 1000$ magnification) of a reaction product of iron with ascorbic acid on which $Ca(OH)_2$ is sprayed, followed by impregnation with ethyl alcohol and drying, the $Ca(OH)_2$ being exhibited as white broken strips in the photograph.

According to the second embodiment of the present invention, a composition further comprising a solid base incorporated in the above-described composition is provided. Here, the solid base includes, for example, CaO, Ca(OH)$_2$, Na$_2$CO$_3$, NaHCO$_3$, MgO, Mg(OH)$_2$, and MgCO$_3$, and refers to one which does not become an aqueous solution when formulated in the composition according to the first embodiment as described above. According to the knowledge of the present inventors, since the reaction product is dissolved if the base becomes an aqueous solution, to thereby lower the effect, a solid base is added to fix the place of the reaction of the composition according to the above-described embodiment, whereby the deodorizing power with regard to hydrogen sulfide type odorous gases can be markedly improved, and the fixing ability of low fatty acids is also improved. The addition of the solid base can be made by, for example, directly spraying powder of the above-mentioned solid base or spraying (or dipping) the same as a mixture with a rapid drying organic solvent when the constituents of the composition of the first embodiment of the present invention are almost dry or after the drying. This stage is shown in the photograph of FIG. 2 (electron microscope photograph of the reaction product of iron and ascorbic acid sprayed with Ca(OH)$_2$ powder, impregnated with ethyl alcohol, followed by drying, magnification +1000). The amount of the solid base formulated is preferably an amount sufficient to fix the place of the reaction, as the best effect is obtained if the place of the reaction is fixed (PH>7.0). Since the reaction product has a pH of 4.0 to 5.5, the amount added is preferably 1% to 10% of the weight of the contacted product.

The present inventors have prepared the compositions of the first and second embodiments of the present invention by using the various metal powders and oxypolybasic acids shown in Table 1.

than that of the Comparative example. Regarding the H$_2$S gas, Examples No. 1 and No. 2 of the second embodiment of the present invention have a stronger deodorizing power than Examples No. 3 and No. 4 of the first embodiment of the present invention.

TABLE 2

| No. | Equilibrium adsorption amount (wt, %) | | Remarks |
| --- | --- | --- | --- |
|  | NH$_3$ gas | H$_2$S gas |  |
| 1 | 10.0% | 8.0% | Composition of 2nd embodiment |
| 2 | 10.0% | 6.0% | Composition of 2nd embodiment |
| 3 | 15.0% | 3.0% | Composition of 1st embodiment |
| 4 | 20.0% | 5.0% | Composition 1st embodiment |
| 5 | 1.0% | 0.1% | Comparative Example |

Figure 4:
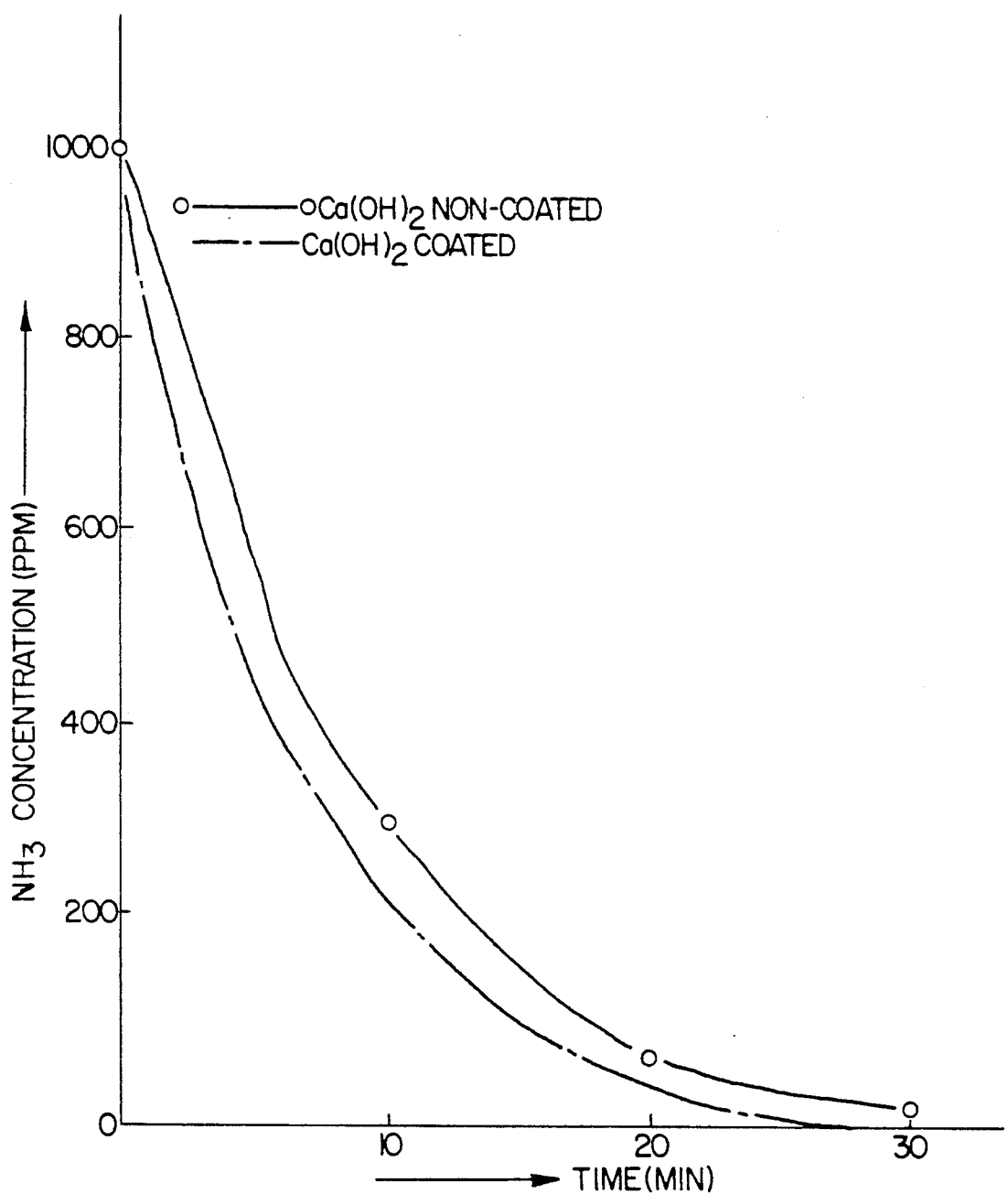
FIG. 4 and FIG. 5 are, respectively, graphs showing the change of $NH_3$ or $H_2 S$, with a lapse of time, in the gas when solid base $Ca(OH)_2$ is added, or the case when solid base $Ca(OH)_2$ is not added to an $NH_3$ containing gas or $H_2S$ containing gas.
Figure 5:
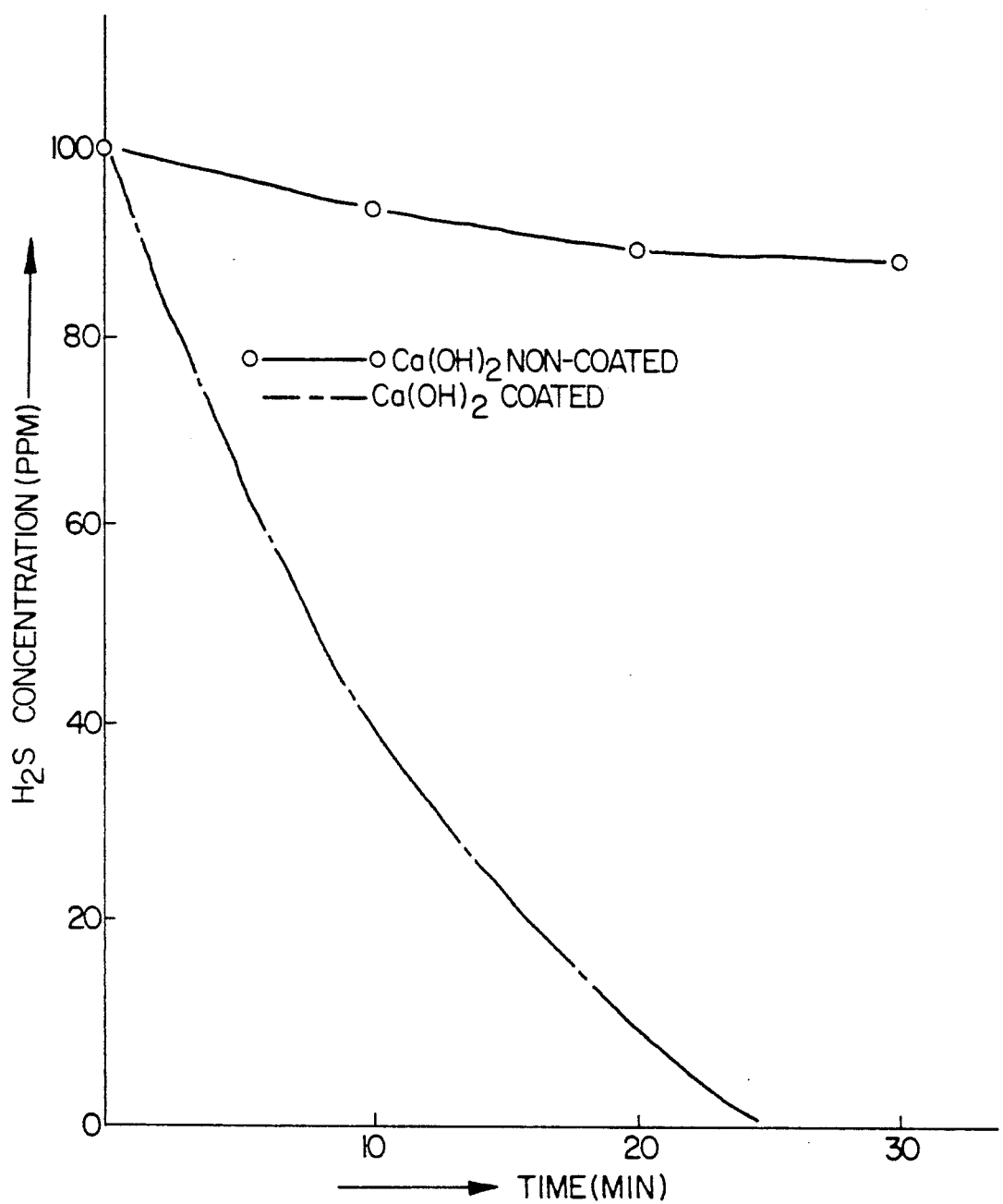

Next, ascorbic acid was added to 10$\mu$ iron powder at a molar ratio of 0.2, then water was added followed by drying by evaporation. Each 5 g of the powder and a mixture of the powder mixed with 3% by weight of powdery Ca(OH)$_2$ was coated onto defatted cotton, for a deodorizing test of NH$_3$ and H$_2$S. The results are as shown in the graphs in FIG. 4 and FIG. 5. The deodorizing test was carried out by introducing the gas into a 40-liter sealed box, and then placing the defatted cotton in the box, and circulating the air in the box by a fan.

In the preferred embodiment of the present invention, for example, the co-existing product of the reaction product and the iron, etc., is formed together with the ascorbic acid, etc., at a mole ratio of 0.005 to 0.5 relative to the iron, etc.

The present inventors prepared various compositions according to the present invention, while using different ratios of iron and ascorbic acid, by adding ascorbic acid having a 3 mole concentration to iron powder of 10$\mu$ in various amounts and at mole ratios of between 0 and 0 followed by evaporation drying 100° C. Each 1 g of the

TABLE 1

| No. | Metal powder | | | Oxypolybasic acid | | Method of mixing contact *2 | Addition mixing of solid base |
| --- | --- | --- | --- | --- | --- | --- | --- |
|  | Kind | Average particle size | Metal components | Kind | Mole rates *1 |  |  |
| 1 | pig iron powder | 10$\mu$ | Fe: 93% | L-ascorbic acid | 0.01 | A | Mg(OH)$_2$ powder 10% *3 |
| 2 | scale reduced iron powder | 30$\mu$ | Fe: 95% | Tartaric acid | 0.01 | B | Ca(OH)$_2$ powder 30% *3 |
| 3 | Fe—Mn alloy powder | 50$\mu$ | Fe: 30% Mn: 65% | Citric acid | 0.10 | C | — |
| 4 | Manganese are reduced powder | 5$\mu$ | Fe: 10% Mn: 80% | L-ascorbic acid Citric acid | 0.10 | A | — |
| 5 | FeSO$_4$ powder | 50$\mu$ | Fe: 32% | L-ascorbic acid | 0.10 | D | Mg(OH)$_2$ powder 10% *3 |

Figure 3:
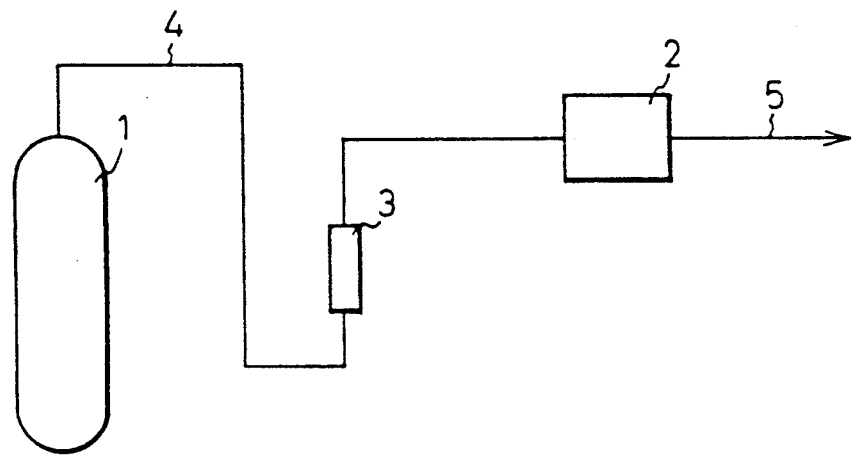
FIG. 3 shows a deodorizing power measuring device.
Figure 6:
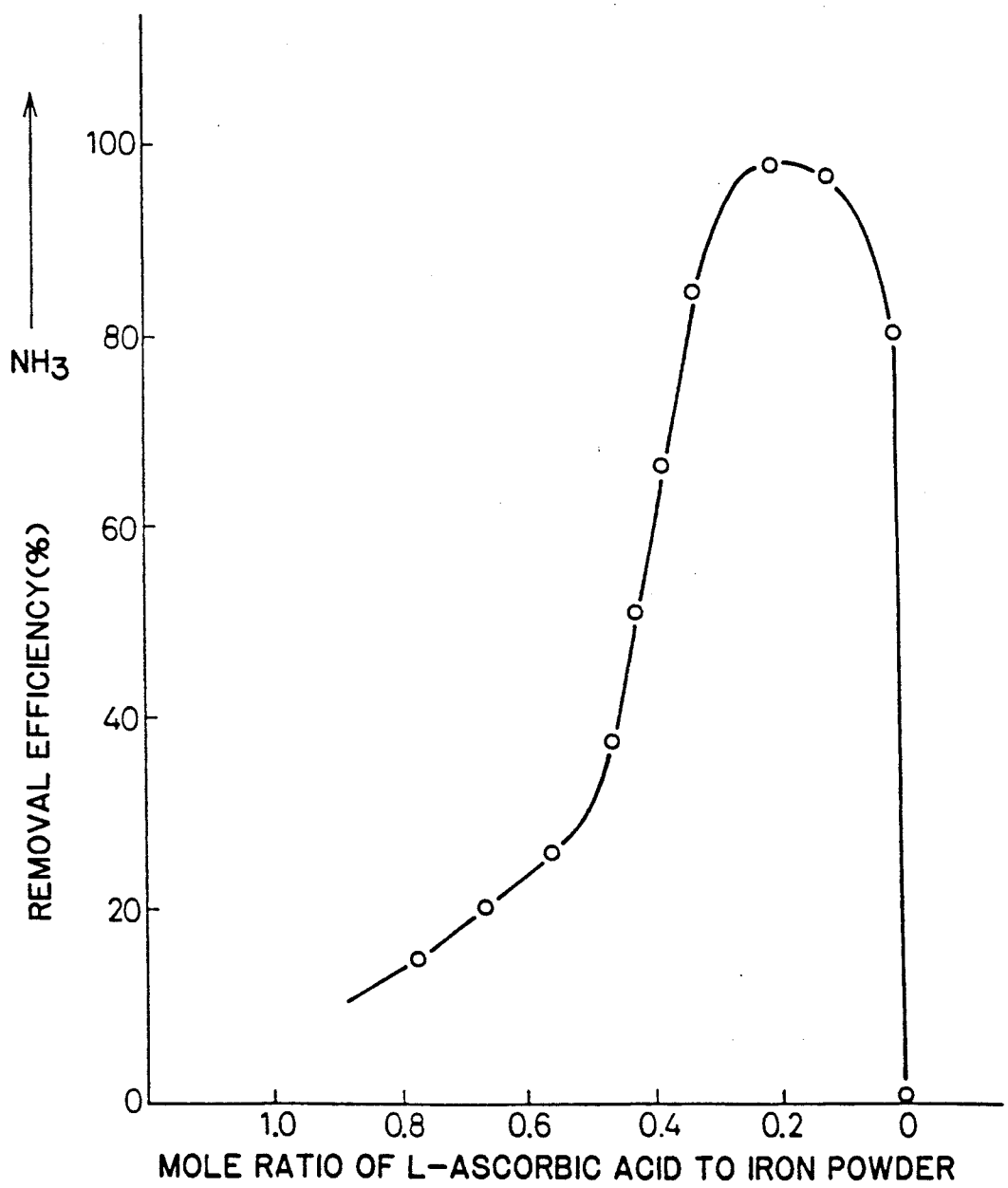
FIG. 6 is a graph showing the relationship between the ratio of ascorbic acid/iron powder and the amount of ammonia removed.
Figure 7A:
FIG. 7 (a) is an electron microscope photograph (magnification: $\times 300$) of $10\mu$ iron powder treated with L-ascorbic acid with a molar ratio of 0.6, and FIG. 7 (b) is an electron microscope photograph (magnification.
Figure 7B:
Figure 9A:
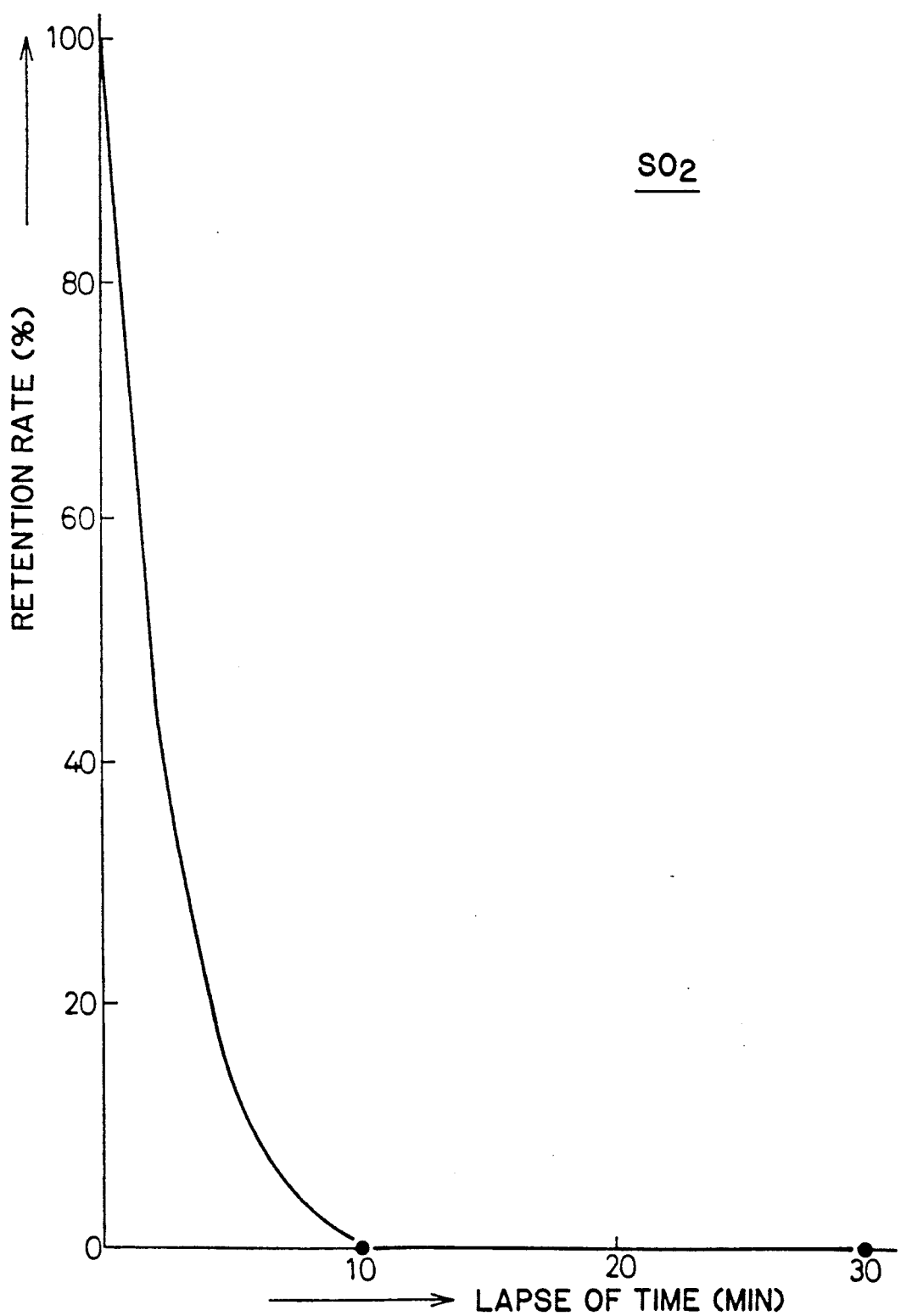
Figure 9B:
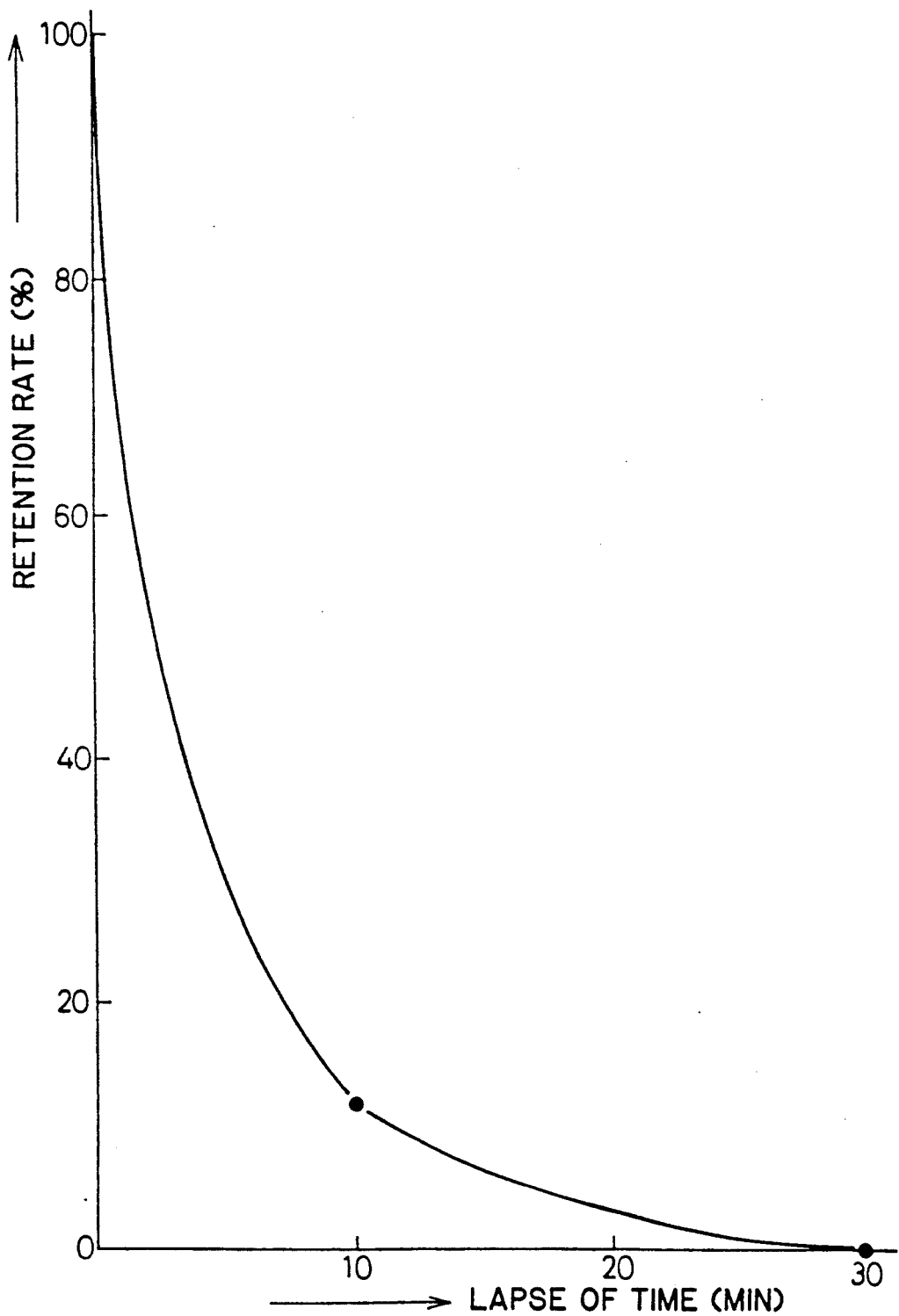
Figure 9C:
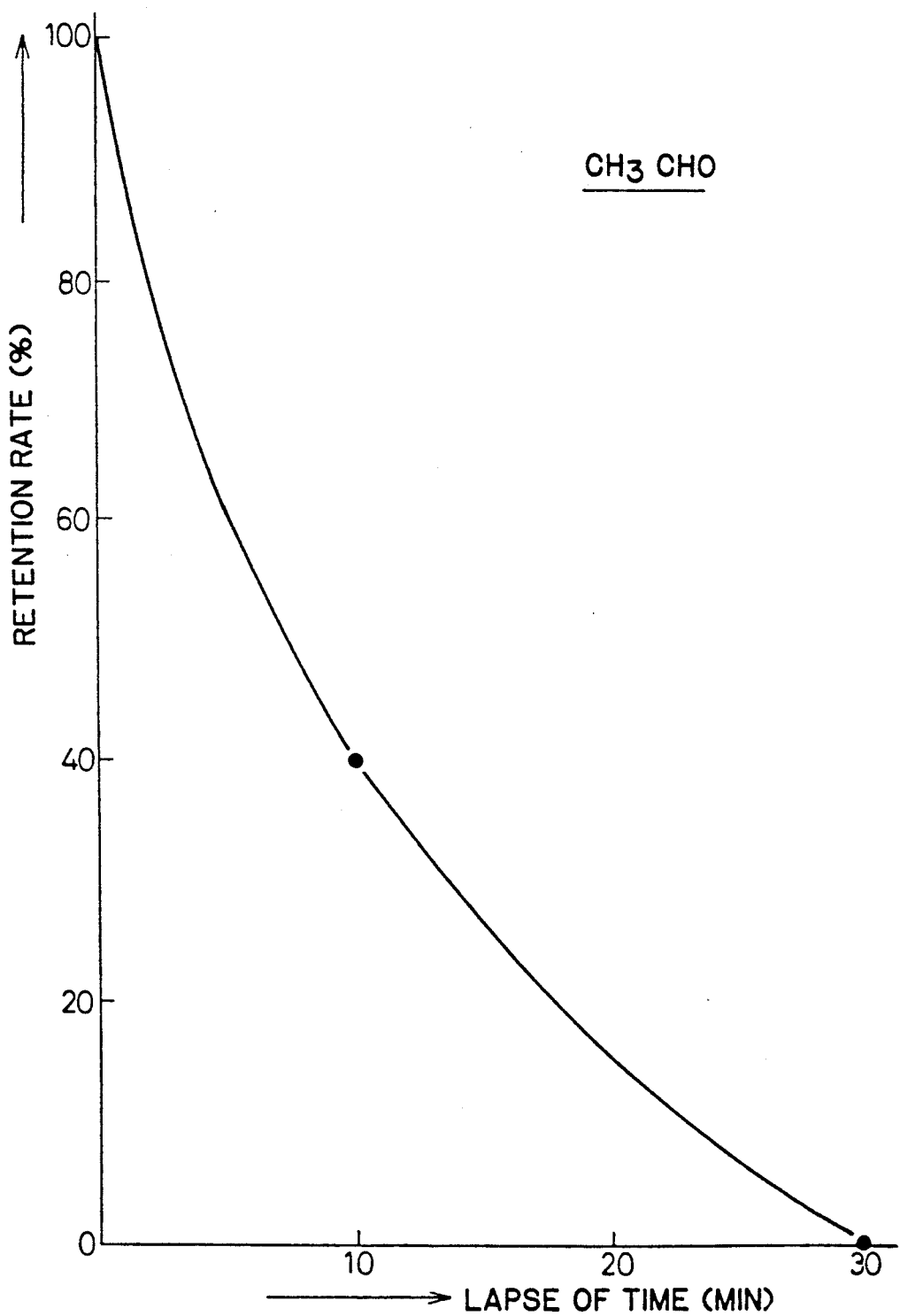
Figure 9D:
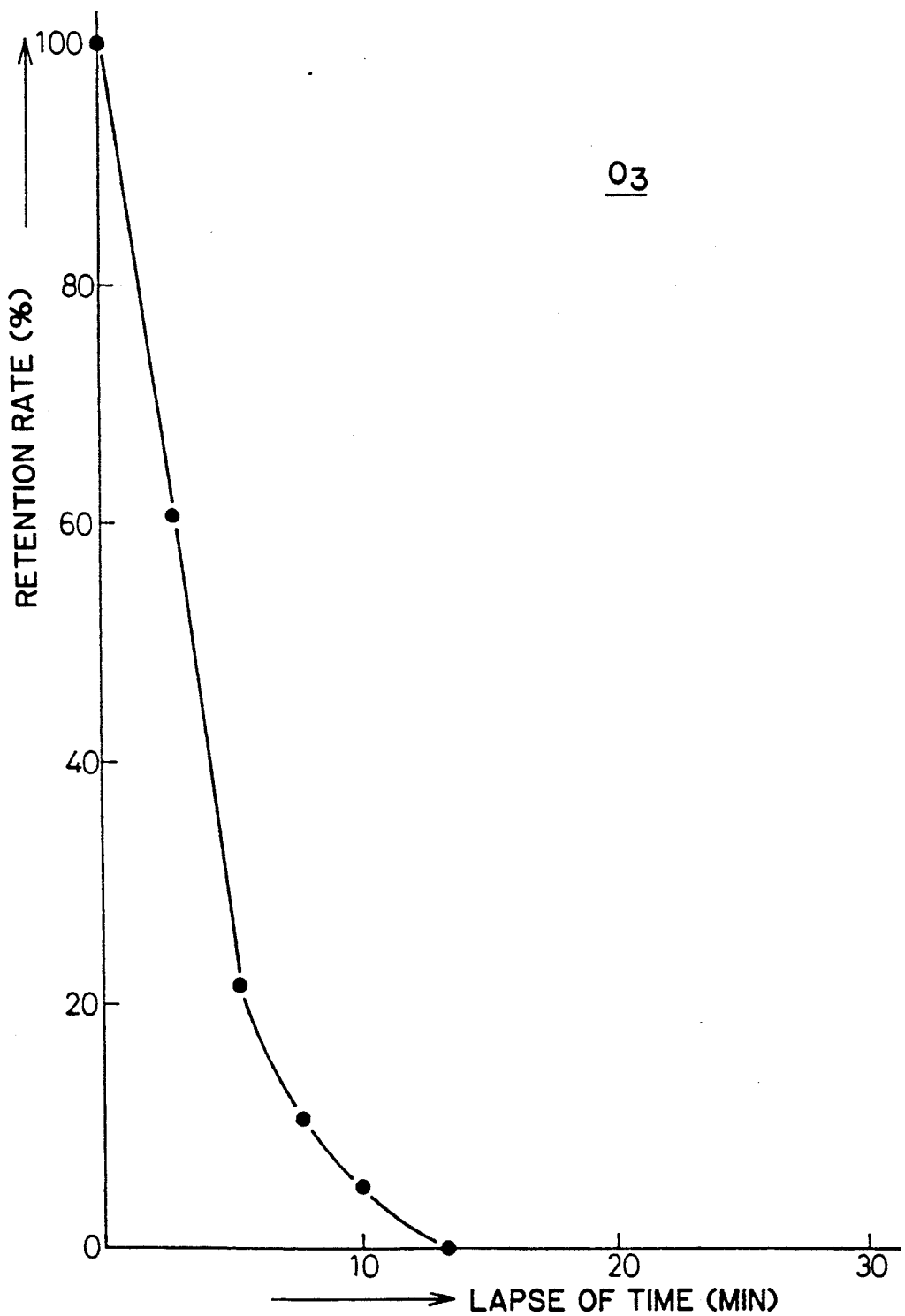

*1: mole ratio of ascorbic acid, etc., to metal
*2: A ... metal powder added to aqueous solution of ascorbic acid, etc., mixed and dried
B ... metal powder sprayed onto aqueous solution of ascorbic acid, etc., mixed and dried
C ... mixed powder of ascorbic acid, etc. and metal powder dried at 80° C. and 100% humidity.
D ... aqueous solution of ascorbic acid added to FeSO$_4$ powder and dried
*3: amount of solid base added based on ascorbic acid, etc. (% by weight), sprayed in mixture with alcohol and dried The deodorizing powers of the respective compositions were measured by the deodorizing measuring device shown in FIG. 3. In FIG. 3, 1 is an odorous gas holder, 2 a sample capsule, and 3 a flowmeter. An NH$_3$ gas or H$_2$S gas was employed as the odorous gas. In FIG. 3, each 1 g of the respective powders in the above Table 1 was charged into the sample capsule 2, the flow of the NH$_3$ gas or H$_2$S gas 4 was controlled at a rate that provided a concentration of 100 ppm, and the equilibrium adsorption amount was measured from the analytical value of the sample capsule outlet gas 5. The results are shown in Table 2. In Table 1 and Table 2, No. 5 is a Comparative example, which is a complex compound obtained by the reaction between FeSO$_4$ and ascorbic acid as a solution. As shown in Table 2, the composition of the present invention has a life 10- to 100-fold greater respective compositions was charged into the sample capsule 2 in FIG. 3, and a flow of a 100 ppm ammonia gas was directed into the capsule, to determine the amount of ammonia removed. The results are shown in FIG. 6. When the mole ratio of (ascorbic acid weight parts)/(iron part weight parts) exceeds 0.5, less ammonia is removed, but as shown in the photographs in FIG. 7 (a) and (b), when the ratio is 0.5 or more, the composition assumes the form in which iron powder is embedded in the ascorbic acid (see FIG. 7 (a), whereby any contact with the gas becomes difficult. On the other hand, when the mole ratio is 0.5 or less, a reaction product is formed around the iron powder (see FIG. 7 (b)), whereby the composition has a form in which a good contact with the gas can be obtained. The composition has a required ammonia removing power even if the mole ratio of (ascorbic acid weight parts)/(iron powder weight parts) is 0.005. This tendency shown in FIG. 6 also occurs in the case of the composition according to the second embodiment of the present invention.

The present inventors determined the air purification power of the present invention by using the device shown in FIG. 8, wherein 6 is the composition of the present invention formed into a filter, which is prepared from a sintered product of a three-dimensional network with a void diameter of 2 mm comprising 80% of iron and 20% of manganese by using 3 parts by weight of ascorbic acid based on 100 parts by weight of said sintered product, and the total weight of the filter 6 is 40 gr, and 7 is a polluted air chamber having a volume of 1 m$^3$. Various polluted airs are introduced into the polluted air chamber 7, as described later, through the introducing inlet 8, and after the introducing inlet 8 is closed the polluted air within the polluted air chamber 7 is circulated in the direction indicated by the arrows 10 by a circulation pump 9 having a capacity of 1 m$^3$/min. Note, 11 is a gas sample collecting outlet. FIGS. 9 (a) to (d) are graphs showing the results of the above tests. FIG. 9 (a) shows an example of polluted air containing 23 to 36 ppm of SO$_2$ before the treatment; FIG. 9 (b) is an example of polluted air containing 10 to 20 ppm of NO$_2$; FIG. 9 (c) is an example of polluted air containing 1 to 3 ppm of acetaldehyde; and FIG. 9 (d) is an example of polluted air containing 1 to 3 ppm of O$_3$. As can be seen from FIGS. 9 (a) to (d), SO$_2$, NO$_2$, acetaldehyde, and ozone in polluted air were decomposed after 10 to 30 minutes, to a residual ratio of 0, to thus provide clean air.

The present inventors also determined the deodorizing performance of ammonia gas and hydrogen sulfide gas, by using the device shown in FIG. 8. As the filter 6 in this case, the employed composition 6-1 was obtained by treating the sintered product of iron in the form of a three-dimensional network with ascorbic acid, and further, formulating Ca(OH)$_2$ therein by using ethanol, and the employed composition 6-2 was obtained by treating a double-layered sintered product of a sintered iron in the form of a three-dimensional network covered by sintering with manganese, with ascorbic acid, and formulating Ca(OH)$_2$ therein by the same method. The Comparative Example is a filter of activated charcoal having the same size. The results are shown in Table 10. FIG. 10 (a) shows an example where NH$_3$ gas was used, and FIG. 10 (b) shows an example where H$_2$S gas was used. The deodorizing ratio was calculated as (gas concentration before treatment—gas concentration after treatment)/(gas concentration before treatment). Compared with the filter of the Comparative Example, the filters 6-1 and 6-2 of the present invention exhibited a stronger deodorizing ratio. It is also obvious that the filter 6-2 using manganese has a stronger deodorizing power than the filter 6-1 using iron alone.

The present inventors exposed the above-mentioned filters (6-1, 6-2, activated charcoal) to 100% NH$_3$ or 100% H$_2$S for 24 hours, and then the air, to bring them into contact with oxygen and moisture components in the air, for 24 hours to regenerate the reaction product, followed by the same deodorizing test by using the same device. The results are shown in FIG. 11 (a) and (b). The filters 6-1 and 6-2 of the present invention were regenerated with air to an extent such that they showed a better deodorizing power than initially shown but the deodorizing power after regeneration of the activated charcoal was zero.

Therefore, the composition of the present invention is also useful as a material for cleaning exhausted gases and harmful gases. When a test was conducted by setting the three-dimensional network iron-manganese sintered porous body (30 mm$\phi \times$ 50 mm) at the rear end of an automobile gas exhaust system, NOx and SOx in the exhausted gas were substantially completely removed.

When a test was conducted by setting a porous body of the same quality as described above at the exhaust vent of a denitrification plant (NH$_3$gas/V$_2$O$_5$ catalysis type) of a boiler-discharge gas disposal equipment in a power plant, the term of use of the V$_2$O$_5$ catalyst was extended from 2 years to 4 years, because undecomposed NH$_3$ was absorbed by the porous body.

The composition of the present invention is also useful as a food freshness retaining agent, and as evidence of this, the present inventors sprayed the compositions of examples No. 1 to 5 in Table 1 over the inner walls of a 20-liter corrugated box, placed samples inside the corrugated box, and compared the freshness retainment of the samples at room temperature (20° C.). The results are shown in Table 3. Material No. 5 is a Comparative example, and is a prior art material considered to have a food freshness retaining power.

TABLE 3

| Sample material | Freshness retaining agent | Food freshness retentivity |
| --- | --- | --- |
| Spinach | No. 1 in Table 1 | Discolored partially brown on day 10 |
|  | No. 5 in Table 1 | Discolored partially brown on day 9 |
|  | — | Discolored partially brown on day 4 |
| Strawberry | No. 2 in Table 1 | Mold partially generated on day 5 |
|  | No. 5 in Table 1 | Mold partially generated on day 6 |
|  | — | Mold partially generated on day 2 |
| Pork | No. 3 in Table 1 | Rotten odor generated on day 4 |
|  | No. 5 in Table 1 | Rotten odor generated on day 4 |
|  | — | Rotten odor generated on day 2 |
| Saurel | No. 4 in Table 1 | Gloss disappeared on day 3 |
|  | No. 5 in Table 1 | Gloss disappeared on day 3 |
|  | — | Gloss disappeared on day 1 |

As can be seen from Table 3, Examples No. 1 to No. 4, which are composition of the present invention have a food freshness retaining power equal to that of Example No. 5, and can extend the freshness retaining term of the samples by about 2-fold, compared with the case when they are not used. The reason why the composition of the present invention has a food freshness retaining ability is not clear, but it can be considered that the generation of active oxygen, etc., as mentioned above, may make a contribution thereto.

The gas purification composition according to the present invention can be prepared by using a molded product of iron, etc., prepared by plastic working, or a worked product of iron, etc., obtained by further subjecting the molded product to a secondary working. Plastic working refers to the plastic working generally employed in a hot or cold working such as hot rolling, cold rolling, extrusion, drawing, and forging, etc. The secondary working is a working in which a further plastic working, cutting or bonding is applied to these molded products, i.e., preparing, for example, a vessel, net, honeycomb, or fiber. The use of these methods enables products shaped as a plate, foil, wire, tube, net, honeycomb, fiber, or fine strip to be obtained inexpensively and easily. Specific methods of causing a contact with ascorbic acid, etc., are described in detail below.

The present inventors subjected an iron foil having a plate thickness of $30\mu$ to hardening by tempering at a temperature of 800° C., to once extinguish the rolled composition and make it susceptible to grain boundary corrosion, then acid washed the surface layer with an aqueous 10% HCl solution for 30 minutes, and thereafter, dipped the foil in an ascorbic acid solution of 1 mole concentration for 30 minutes, followed by drying in the air at 100° C., to form a reaction product on the surface of the iron foil. Further, a mixture of methanol and $Na_2CO_3$ was sprayed onto the surface to prepare a composition comprising an iron foil with a surface pH of about 8, as the base material. Using this composition as the honeycomb material shown in FIG. 12, a deodorizing cylinder shown in FIG. 12 with a diameter of 10 cm and a length of 10 cm was prepared and stood in a toilette for domestic use for one year, in which period no odor was found. In FIG. 12, 12 is the composition of the present invention shaped in a honeycomb, and 13 the holding board thereof.

The present inventors also dipped a metal net made of iron and having a mesh size of 1 mm in a solution of ascorbic acid of 2 mole concentration for 10 minutes, to form a reaction product on the surface of the metal net, which was then dried at room temperature to form a composition in the shape of a net. The net-shaped composition was placed as a lining on the inner surface of a 20-liter volume corrugated box and fresh foods shown in Table 4 were placed inside the box, and maintained at room temperature, to determine the freshness retaining power.

TABLE 4

| | Spinach | Strawberry | Pork | Saurel |
|---|---|---|---|---|
| Ascorbic acid treated wire net | Discolored partially brown on day 10 | Mold partially generated on day 5 | Rotten odor generated on day 4 | Gloss disappeared on day 3 |
| — | Discolored partially brown on day 4 | Mold partially generated on day 2 | Rotten odor generated on day 2 | Gloss disappeared on day 1 |

As can be seen from Table 4, the corrugated box lined with the net-shaped composition of the present invention was found to have a freshness retaining power about 2-fold that of conventional deodorizers and freshness-retainers.

Next, the method of preparing the composition of the present invention by using a powder of iron, etc., or a molded product using a powder of iron, etc., is explained. According to this method, the powdery iron, etc., is allowed to react with ascorbic acid to obtain a powdery co-existing product wherein the surface of powder is the reaction product and the inner material of the powder is unreacted iron. FIG. 13 shows an example of a co-existing product prepared by mixing iron powder, etc., having an average particle size of $50\mu$, and 0.10 mole of ascorbic acid, followed by natural drying. In FIG. 13, 14 is a reaction product formed in the shape of a tortoise shell on the inner portion 15 of iron.

When powdery iron, etc. having a different particle size is employed, a finer powder will become the reaction product also of the inner material, but the inner material of a coarse powder will be unreacted iron, etc., and therefore, a powdery co-existing product is obtained. The compositions of the present invention of Examples No. 1 to No. 4 shown in Table 1 and Table 3 are examples of the powdery compositions prepared according to this method.

Further, the powder of iron, etc., can be kneaded by an appropriate binder to form a kneaded product, to thereby provide molded products having various shapes. As the binder to be used for this purpose, there can be employed inorganic binders such as water glass, cement, and bentonite, and organic binders such as CMC, polyacrylate, and methylcellulose. As the molding method, there can be employed an extruder, rolls, pelletizer, or injection molding machine. According to this method, rod-shaped products, such as spherical, cylindrical, hollow, and polygonal shapes, strip-shaped products, particle-shaped products, and mass-shaped products can be prepared. In the above-mentioned method, these molded products are placed in contact with the ascorbic acid, etc., to prepare co-existing products of the reaction product of the iron, etc., with the ascorbic acid.

The powder of iron, etc. also can be carried on a metallic or non-metallic carrier by using a binder to form a molded product. For example, the powder of iron, etc., can be coated on the surface of glass spheres or organic polymeric spheres to form a spherical molded product. As the organic polymeric sphere, organic polymeric spheres subjected to a foaming treatment, for example, styrene expanded foam (manufactured by Sekisui Kagaku K.K.), Expancellplastic fine hollow sphere (manufactured by Japan Ferrite K.K.), Epoxyballoon (manufactured by Emerson Cumming Co.), etc., can be subjected to a foaming treatment (heating treatment with vapor and hot water) before use to provide organic polymeric spheres with an apparent specific gravity of 0.30 or less. The use of the organic polymeric spheres subjected to the foaming treatment enables the provision of lightweight and spherical molded products. These molded products can be brought into contact with the ascorbic acid, etc., to provide the co-existing product of the present invention.

FIG. 14 shows an example of the spherical composition of the present invention prepared according to this method, in which 18 is an organic polymeric sphere, 16 is the reaction product of ascorbic acid, etc., with iron, etc., and 17 is unreacted iron, etc.

As the carrier, for example, a porous body having three-dimensionally communicating pores, such as urethane foam, etc., can be used. For example, when the iron powder, etc., is coated on the skeleton of urethane foam, a porous molded product having three-dimensionally communicating pores wherein the skeleton is covered with the iron powder, etc., is obtained, and the porous product also can be brought into contact with ascorbic acid, etc., to prepare a co-existing product. The use of an organic three-dimensional fabric (manufactured by Kabushiki Kaisha Arisawa Seisakusho), instead of the urethane foam, enables a porous molded product having three-dimensionally communicating pores to be similarly obtained.

As other carrying methods, those having metal powder carried on synthetic resins, such as metal mixed spun fibers, metal mixed foamed materials of a synthetic resin starting material (e.g., polyurethane, polyester, polystyrene) supplemented with a metal and subjected to a mixing synthetic treatment to form fibers and foams also can be used and treated with ascorbic acid, etc., to give the desired co-existing product.

The co-existing product which is a rod-shaped product, strip-shaped product, particle-shaped product, or mass-shaped product, as previously mentioned, or the co-existing product prepared by using spherical bodies of, for example, organic polymeric spheres coated on the surface with the powder of iron, etc., also can be housed in an air permeable housing vessel to be used as the filter for air purification, but the composition using the co-existing product produced from the porous molded product having three-dimensionally communicating pores requires no housing vessel, and thus has an advantage in that it can be used as such as a filter for air cleaning.

The molded products of the compositions of the present invention which may be carried on carriers include all molded products and molded products carried on carriers.

Further, as a method of carrying the iron, etc., the iron, etc. can be carried on organic and inorganic materials by electrolytic, electroless plating. The molded product can be treated with ascorbic acid, etc., to obtain the co-existing product of the present invention. As such an organic material, a synthetic or fibrous urethane foam, etc., can be used, and as the inorganic material, glass, etc., can be used.

The composition of the present invention can be prepared by molding powder or particles of iron, etc., placed in contact with ascorbic acid, etc., such as the powdery product or the particulate product shown in FIG. 13, by using a binder, or by molding the same when carried on a metallic or non-metallic carrier. The same binder, molding method, and carrier as described above can be used as the binder, the molding method, and the carrier in this method. FIG. 15 shows an example of the co-existing product in FIG. 14 when carried on organic polymeric spheres, wherein 21 is an organic polymeric sphere, 19 unreacted inner material of iron powder, etc., and 20 the reaction product. The composition prepared by using the co-existing product prepared in the example shown in FIG. 14 has a broad active surface area, and therefore, when the spherical composition is filled in a large number of air-permeable housing vessels and used as a filter for air cleaning, a filter with a high air purification efficiency can be obtained. In FIG. 15, 22 is an example of the flow passage of polluted air in the above case.

The composition of the present invention can further form a sintered product of iron, etc., which is brought into contact with ascorbic acid, etc., to prepare a co-existing product. Namely, a molded product having a large unevenness, large surface area, and many micro- and macro-voids with which gases can be easily and completely brought into contact can be readily obtained by sintering. When a co-existing product is prepared by using such a molded product, the area at which the reaction product comes into contact with the iron, etc. is broad and has micro- and macro-voids which exhibit an anchoring effect, and thus the reaction product is brought into close contact with the metal such that it is not easily detached therefrom, and further, the area of contact between polluted air and the composition is broad, and therefore, the activity of the gas purification material is maintained and a superior carrier is provided.

An iron powder to be used for the sintered product and containing, for example, 2.0 to 4.5% by weight of carbon, can be readily pulverized, and an iron powder with an average particle size of $50\mu$ or less can be prepared easily and economically by a dry process pulverization or wet process pulverization.

The iron-manganese alloy powder can be prepared by, for example, pulverizing ferromanganese.

The manganese powder can be obtained by pulverizing metallic manganese or reducing manganese ore.

The oxidized iron powder can be obtained by boiling iron powder containing 2.0 to 4.5% of carbon, in boiling water, to produce an oxidized iron powder having an oxidized surface and further, as the oxidized iron powder per se a powder obtained during, for example, the iron steel steps in an iron plant can be used.

The oxidized manganese powder can be obtained by pulverizing manganese ore, or treating a powder of manganese carbonate.

The carbon powder can be obtained by, for example, pulverizing a graphite electrode, or by using a fine powdery coke.

The composition of the present invention can be prepared by further adding Si, Ni, Cr, Mo, Cu, and Al, etc., thereto, which elements may be added as a metallic powder, or iron containing these metals can be pulverized and added. Si, Ni, Cr, Mo, Cu, and Al, etc. are added to improve the strength, heat resistance, and corrosion resistance of the sintered product.

In accordance with the present invention, the respective powders as mentioned above are blended and kneaded with a binder. As the binder, inorganic binders such as water glass, cement, and bentonite, etc., or organic binders such as CMC and polyacrylate, etc., can be used. By controlling the particle size of the respective powders to $50\mu$ or less, the kneaded product obtained by kneading can be easily molded as is or molded when carried on a carrier.

The kneaded product can be molded into a molded product having the same shape as mentioned above, by using an extruder, rolls, pelletizer or injection molding machine. The kneaded product also can be molded into a molded product by being coated on and carried at the surface of the same organic polymeric spheres as mentioned above.

According to the present invention, the molded product is subsequently sintered. Conventionally, the molded product obtained by working molding can be subjected to a sintering heat treatment to provide a sintered product corresponding to the shape of the molded product. In the molded product carried on organic polymeric spheres, the organic polymers will be eliminated by pyrolysis at 400° C. during the sintering, and will become a hollow spherical sintered product.

The temperature and time for sintering must be controlled in accordance with the mixing ratio of the starting material metals such as Fe and Mn, but the macro-void ratio in the sintered composition after sintering has a great influence on the air purification efficiency. According to tests by the present inventors, as shown in FIG. 16, this efficiency is greatly lowered at a void ratio (void area/whole area of field of vision ×100 at a microscope magnification of ×200) of 15% or less. This is considered to be due to the fact that sufficient acid is not carried on the sintered product, and that the surface area becomes smaller. The void ratio can be freely controlled by controlling the above-mentioned sintering temperature and adding a pyrolyzable powder, as described later, to the kneaded product. Note, it is a specific feature of a sinterable metal that the void ratio thereof can be controlled.

According to the present invention, when preparing powdery starting materials, the carbon and oxygen therein can be controlled as shown in the following formula, to prepare a sintered product:

$$[C] > 2.1\%$$

$$4/3\ ([C]-2) < [O] < 4/3\ ([C]+7)$$

where
- [C]: carbon content in powdery starting material (wt.%)
- [O]: oxygen content in powdery starting material (wt.%).

If [C] in the powdery starting material is greater than 2.1%, co-crystals of iron and $Fe_3C$ will be formed and the liquid phase sintering easily effected.

FIG. 17 is a graph showing the influences of [O] and [C] in the powdery starting material on the properties of the sintered product. By controlling the components as shown in the above-mentioned formula, the sintered product prepared is free from heat distortion cracking, and further, a sintered product with a high toughness can be obtained.

Further, the sintered product using the powdery starting material containing [C] and [O] of the above-mentioned formula generates CO gas and $CO_2$ gas from [C] and [O] through a self-reduction reaction during sintering, and a large number of micro-bubbles remain after the degassing of CO gas and $CO_2$ gas in the sintered product. The sintered product, therefore, has a large surface area having macro- and micro-bubbles, and when later brought into contact with ascorbic acid, etc., the ascorbic acid, etc. penetrates the small pores to further broaden the contact area with the reaction product, to thereby provide a composition with a good reactivity. The composition also has large area in contact with polluted air, and this is an efficient air purification material.

FIGS. 18 (a) and (b) show the surfaces of the sintered product of the sintered product where the [C] and [O] has been thus controlled, in which 23 is a small bubble after degassing of CO gas and $CO_2$ gas, and 24 is a matrix after sintering.

According to the present invention, when preparing the thus sintered product, a pyrolyzed product which generates a gas during sintering is added to the powdery starting material. Therefore, by increasing the surface area of the sintered product, increasing the contact area between the iron, etc., and the reaction product, or increasing the contact area between the composition and the polluted gas, an air purification material with an even stronger air purification power can be obtained. To increase the surface area of the sintered product, an organic material such as plastic powder and sawdust, etc., or a carbonate such as limestone powder and dolomite powder, etc., are effective when added. In the case of an organic material, a pyrolysis occurs at 200 to 400° C., but a carbonate powder is pyrolyzed at 900° to 1100° C. and traces of the liberated gases remain as voids on the surface of the sintered product. FIG. 19 shows an example of a sintered product having such voids, in which 24 is the matrix after sintering, and 25 is a void. When the sintered product is brought into contact with the ascorbic acid, etc., due to the large surface area thereof, a composition having a higher activity can be obtained.

According to the present invention, the above-described sintered product can be formed as a plate, tube, hollow particle, or mass, etc.

As described above, when molding the kneaded product with a binder to form the powdery starting material, a plate-shaped product can be obtained by, for example, roll molding, a tube-shaped product can be obtained by, for example, extrusion molding, and a particle-shaped molding can be obtained by, for example, pelletizing, and when sintered these molded products are produced as sintered products having the shape of a plate, a tube, or particles. A hollow particulate sintered product, as already described, can be obtained by sintering the kneaded product on the surface of organic polymeric spheres; a mass product can be obtained by preparing and then crushing a large sintered product.

In another example of the present invention, the coexisting product can be prepared by bringing the sintered product into contact with the ascorbic acid, etc., but if the substrate is a sintered product it is not easily broken, and therefore, is most suitable as an air purification element which purifies polluted air by passing the air through a large number of elements housed in an air-permeable housing vessel.

In another example of the present invention, the composition can be prepared as the shaped sintered products described above, while obtaining a sintered product having three-dimensionally communicating pores.

The composition using a porous sintered product having three-dimensionally communicating pores does not require an air-permeable housing vessel, and can be arranged as such in, for example, a polluted air pathway, and by passing polluted air therethrough, for example, NOx, SOx and odorous components contained in the polluted air can be decomposed during the passage therethrough and the air made clean.

An example of the method of preparing such a sintered product having three-dimensionally communicating pores is specifically described as follows.

The first example comprises a kneaded product of the powdery starting material and a binder coated on the skeleton of an organic three-dimensional porous body. As the organic three-dimensional porous body, a urethane foam or an organic three-dimensional fabric as mentioned above can be employed. It is difficult to coat the powdery starting material with an average particle size of 50μ or more on the skeleton of the organic three-dimensional porous body, and thus the coating of the kneaded product is performed by a roll squeeze method, the spraying method or dipping method. By heating the organic three-dimensional porous body coated with the kneaded product at 300° to 350° C. for 2 to 3 hours, the organic polymer will be eliminated by pyrolysis, to effect defatting. Further, by heating to 800° to 1200° C. for about 60 minutes, the coated kneaded product is sintered to obtain a sintered product comprising a sintered skeleton having three-dimensionally communicating pores. The carbon contained in the powdery starting material reduces the metal oxides during the sintering.

The present inventors prepared an iron powder (C: 4.0%, O: 6.4%, Mn: 0.38%, Si: 0.1%, P: 0.01%, S: 0.02%, balance: Fe) having an oxidized surface and an average particle size of $10\mu$, by pulverizing a powdery iron (C: 4.3%, Si: 0.1%, Mn: 0.4%, P: 0.01%, S: 0.02%, balance: Fe) by the wet process, and boiling the powder in boiling water. The iron powder was kneaded with CMA and water, and coated onto a urethane foam with a void diameter of 2 mm, by the spraying method, and subjected to heat treatments for drying (100° C.), defatting (200° C.), self-reduction (800° C.), and sintering (1100° C.) in a nitrogen atmosphere, to prepare a sintered porous body having three-dimensionally communicating pores. An enlarged view of the appearance thereof is shown in FIG. 20.

The present inventors also formed a kneaded product similar to that described above and coated the same on urethane foam, and after drying, further applied another coating of a kneaded product obtained by kneading metallic manganese powder having an average particle size of $5\mu$, a plastic powder having an average particle size of $10\mu$, at a volume ratio of 50% with CMC and water. Thereafter, the same heat treatment as described above was applied to form a double-layered sintered porous body having three-dimensionally communicating pores, with the inner layer comprising iron and the outer layer comprising a highly porous manganese. FIG. 21 shows an enlarged view of the appearance of this product.

In FIG. 20 and FIG. 21, 26 is the skeleton of the sintered product, 27 is a pore formed after a degassing of CO and $CO_2$ gases, 28 is a void formed after pyrolysis of the pyrolyzing agent, and a metallic powder gap, and 29 is the three-dimensionally communicating pore.

The porous body having the three-dimensionally communicating pores shown in FIG. 20 and FIG. 21 was dipped in a 30% tartaric acid solution to prepare the co-existing product of the present invention, and together with the co-existing product as the final composition, it was employed as the deodorant in the device shown in FIG. 8. FIG. 10 and FIG. 11 are graphs showing the results, and as shown in FIG. 10 and FIG. 11, the composition was found to have a strong deodorizing power. In FIG. 10 and FIG. 11, 6-1 is an example in which the sintered product in FIG. 20 is employed, and 6-2 an example in which the sintered product in FIG. 21 is employed.

As a three-demensional example, the sintered product having three-dimensionally communicating pores also can be prepared according to the method as described below. FIG. 22 illustrates the preparation steps thereof, wherein a mold frame 31 is filled with a large number of organic polymer spheres 30 and pressure applied to the upper portion thereof. This pressure brings the organic polymer spheres 30 into mutual contact with each other, and thus while under pressure at the upper portion, the kneaded product is permitted to flow into the voids within the mold frame 31 and heat treated as such. This heat treatment causes the organic polymer spheres to be eliminated by pyrolyzation, to thereby form voids which are three-dimensionally communicating at the plane contact portion, whereby the kneaded product becomes a sintered product.

FIG. 23 shows an example in which the organic polymer spheres 30 are mutually bonded with a pyrolyzable adhesive 32. In this case also, the kneaded product of the powdery starting material and the binder is permitted to flow into the voids and is heat treated, and the organic polymer spheres 30 and the adhesive 32 are eliminated by pyrolyzation to thereby form three-dimensionally communicating pores, whereby the kneaded product becomes a sintered product. According to the example shown in FIG. 23, a sintered product having three-dimensionally communicating pores with quantitated voids can be obtained. Note, the sintered product having three-dimensionally communicating pores as mentioned above also includes the sintered products prepared in the examples shown in FIG. 22 and FIG. 23.

According to the present invention, when bringing the ascorbic acid into contact with the iron, preferably an aqueous solution of ascorbic acid having a concentration of 0.1 to 5 mole is used, and an aqueous solution of the iron is dipped in the aqueous solution and taken out and dried, or the aqueous solution is sprayed onto the iron and then dried, to prepare the composition of the present invention.

In this case, when the aqueous solution of ascorbic acid has a concentration of less than 0.1 mole, the formation rate of the reaction product is slow, and further, the amount of reaction product becomes smaller. Conversely, when it exceeds 5 moles, a large amount of unreacted ascorbic acid will remain in the reaction product, whereby the reaction product is covered with unreacted ascorbic acid and the gas purification effect may be undersirably reduced. For example, if the ascorbic acid having a concentration of 5 moles or higher is placed in contact with the above-mentioned porous sintered product, the pores of the porous material may be clogged with the ascorbic acid. In this case, preferably the contact reaction is carried out with an aqueous solution having a molar ratio of 0.05 to 0.5 relative to the metal, followed by evaporation drying as such, to cause the reaction product to co-exist with the powder.

According to the knowledge of the present inventors, products having a relatively large shape are preferably coated at a mole ratio of 0.1 to 5 moles of the ascorbic acid relative to the metal, by the dipping method or the spraying method, and products with small shapes such as the powder are mixed at a mole ratio of 0.005 to 0.5 of the ascorbic acid, and dried as such, and the ascorbic acid placed in contact by such methods provides a co-existing product in which the reaction product is closely attached to the iron, etc.

In accordance with the present invention, a composition shaped as a non-woven fabric is also provided. As already described, as the co-existing product of the iron and the ascorbic acid, products shaped as particles, foils, and fibers can be obtained. In these embodiments, by using the existing product and one or more fibers selected from synthetic fibers, glass fibers, natural fibers, cellulose, and carbon fibers, these fibers can be mixed to form a composition shaped as a non-woven fabric. Alternatively, after mixing or adhering these fibers to form a non-woven fabric, a solid alkali can be formulated on the surface to form a composition shaped as a non-woven fabric. The composition shaped as a non-woven fabric can be used as a filter for a simple air cleaning and dust collection, and further, as a food freshness retaining agent when coated on the inner surface of a corrugated board.

According to another embodiment of the present invention, the product shaped as powders, foils, and fibers, which is a co-existing product of the iron and the ascorbic acid, can be formulated with a solid base and then mixed with one or more of synthetic fibers, glass fibers, natural fibers, cellulose fibers, and carbon fibers, to form a composition shaped as a non-woven fabric, and can be used for the same purposes as described above.

According to another embodiment of the present invention, a composition shaped as a non-woven fabric can be obtained by a different preparation method. Namely, in this embodiment, one or more elements selected from a metal powder, a foil, fibers of the iron, and one or more fibers selected from synthetic fibers, glass fibers, natural fibers, cellulose fibers, and carbon fibers are bound together to form a non-woven fabric, the non-woven fabric is placed in contact with the ascorbic acid, and the metal powder, foil or fibers of the iron will form a co-existing product of the reaction product and the iron, by contact with ascorbic acid, to thereby provide an air purification product and food freshness retaining agent. In these embodiments, the diameter of the metal powder, the thickness of the foil, and the diameter of the fibers is preferably 1µ to 1 mm, and this dimension is particularly preferable for the formation of a non-woven fabric. By placing the ascorbic acid in contact with the non-woven fabric, and further, formulating a solid base on the surface thereof, the deodorizing power is strengthened against odorous gases such as sulfur compounds and lower fatty acids. The composition shaped as a non-woven fabric also can be used for the same purposes as described above.

Industrial Applicability

As described above, the composition having the gas purification power of the present invention can effectively remove harmful NOx gases, SOx gases, and $O_3$ gas, and can be used for removing nitrogen compound type gases, sulfur compound type gases, and lower fatty acids, which are a source of objectionable odors.

The composition having the gas purification effect of the present invention also retains a strong gas purification effect even when used over a long term.

The composition having the gas purification effect of the present invention can be easily and simply prepared, at a low cost.

The purification composition having the gas purification effect of the present invention further can be used as a food freshness retaining agent.

We claim:

1. A composition for gas purification comprising a reaction product of at least one solid metal selected from the group consisting of iron, manganese, chromium, nickel, zinc, aluminum, copper, tin and cobalt and alloys containing these metal elements with at least one oxypolybasic acid, wherein unreacted metal remains therein while co-existing therewith and wherein the reaction product covers the surface of the solid metal.

2. A composition according to claim 1, wherein a reaction product of iron and/or manganese with at least one acid selected from ascorbic acid, citric acid, tartaric acid and gluconic acid, and unreacted iron and/or manganese are contained and co-existing therein.

3. A composition according to claim 1, which further comprises a solid base.

4. A composition according to claim 1, wherein 0.005 to 0.5 mole of the oxypolybasic acid is contained in the composition based on 1 mole of the metal.

5. A composition according to claim 2, wherein 0.005 to 0.5 mole of at least one acid selected from the group consisting of ascorbic acid, citric acid, tartaric acid and gluconic acid is contained based on 1 mole of iron and/or manganese.

6. A composition according to claim 1, wherein said metal is a powder or a product molded from a powder.

7. A composition according to claim 2, wherein said metal is a powder or a product molded from a powder.

8. A composition according to claim 1, wherein the reaction product of a molded product of at least one metal selected from the group consisting of iron, manganese, chromium, nickel, zinc, aluminum, copper, tin and cobalt and alloys containing these metal elements molded by plastic working or a secondary working of said molded product with at least one oxypolybasic acid is a co-existing product in which said molded product or secondary worked product of said molded product co-exists in an unreacted state, and optionally, a solid base is further formulated in said co-existing product.

9. A method of preparing the composition according to claim 2, which comprises preparing the co-existing product by bringing a molded product of iron or iron and manganese molded by plastic working or a secondary worked product of said molded product into contact with at least one acid selected from ascorbic acid, citric acid, tartaric acid and gluconic acid.

10. A method of preparing the composition according to claim 6, wherein a molded product of iron or iron and manganese molded by plastic working or a secondary worked product of said molded product is shaped as a plate, foil, wire, tube, net, honeycomb, fiber of fine strip.

11. A method of preparing the composition according to claim 2, which comprises bringing iron and/or manganese powder, a metal molded product molded or molded and worked from said powder by using a binder, or a molded product wherein said powder is carried on a metallic or non-metallic carrier by using a binder, into contact with at least one acid selected from ascorbic acid, citric acid, tartaric acid and gluconic acid.

12. A composition according to claim 1, wherein the reaction product of a powder or particles of at least one metal selected from the group consisting of iron, manganese, chromium, nickel, zinc, aluminum, copper, tin and cobalt and alloys containing these metal elements with at least one oxypolybasic acid is a molded product molded by using a co-existing product in which unreacted powders or particles of said metal exist, and optionally, a solid base is formulated in said molded product.

13. A method of preparing the composition according to claim 2, wherein iron and/or manganese is flame-sprayed or plated onto a non-metallic carrier to form a molded product having the metal carried thereon, before contact with at least one acid selected from the group consisting of ascorbic acid, citric acid, tartaric acid and gluconic acid.

14. A method of preparing the composition according to claim 2, wherein powder or particles of iron and/or manganese are brought into contact with at least one oxypolybasic acid selected from ascorbic acid, citric acid, tartaric acid and gluconic acid, and the resulting product is molded by using a binder, or said product is molded while it is carried on a metallic or non-metallic carrier.

15. A composition according to claim 1, wherein the reaction product of a sintered product of iron and/or manganese with at least one acid selected from the group consisting of ascorbic acid, citric acid, tartaric acid and gluconic acid is a co-existing product in which said sintered product co-exists in an unreacted state, and optionally, a solid base is further formulated in said co-existing product.

16. A method of preparing the composition according to claim 2, which comprises kneading a powdery starting material containing at least one metal selected from iron powder, iron-manganese alloy powder, manganese powder, iron oxide powder and manganese oxide powder, and further, optionally containing carbon powder with a binder, further optionally, adding at least one element selected from Si, Ni, Cr, Mo, Cu and Al to form a kneaded product, sintering the molded product from said molded product or the molded product while said kneaded product is carried on a carrier to form a sintered product of iron and/or manganese, and bringing said sintered product into contact with at least one oxypolybasic acid selected from ascorbic acid, citric acid, tartaric acid and gluconic acid.

17. A preparation method according to claim 16, wherein the carbon and oxygen in the powdery starting material are controlled as in the following formula:

$$[C] > 2.1\%$$

$$4/3\,([C]-2) < [O] < 4/3\,([C]+7)$$

where
- $[O]$: oxygen content in powdery starting material (% by weight),
- $[C]$: carbon content in powdery starting material (% by weight).

18. A preparation method according to claim 16, wherein a pyrolyzed product which generates gas during sintering is further added to the powdery starting material.

19. A preparation method according to claim 16, wherein the sintered product is a product shaped as a plate, tube, particle, hollow particle or mass.

20. A preparation method according to claim 16, wherein the sintered product is a sintered product having three-dimensionally communicating pores.

21. A preparation method according to claim 9, wherein the method of providing a contact between at least one acid selected from ascorbic acid, citric acid, tartaric acid and gluconic acid is a method in which the material to be brought into contact is dipped in an aqueous solution of said acid with a concentration of 0.1 to 5 mole and taken out and dried, or said solution is sprayed onto the material to be brought into contact and then dried.

22. A preparation method according to claim 9, wherein the method of providing a contact between at least one acid selected from ascorbic acid, citric acid, tartaric acid and gluconic acid is a method in which an aqueous solution containing at least one acid selected from ascorbic acid, citric acid, tartaric acid and gluconic acid at a molar ratio of 0.005 to 0.5 relative to iron and/or manganese is added to iron and/or manganese, and the mixture is kneaded and dried as such.

23. A preparation method according to claim 9, wherein the method of providing a contact between at least one acid selected from ascorbic acid, citric acid, tartaric acid and gluconic acid is a method in which an aqueous solution of at least one acid selected from ascorbic acid, citric acid, tartaric acid and gluconic acid is added constantly, periodically or intermittently to iron and/or manganese.

24. A composition according to claim 2, which is shaped as a non-woven fabric, wherein the co-existing product in which the reaction product of at least one metal selected from iron, manganese, chromium, nickel, zinc, aluminum, copper, tin and cobalt with at least one acid selected from ascorbic acid, citric acid, tartaric acid and gluconic acid coexists with unreacted said metal shaped as a powder, foil or fiber, and at least one fiber selected from the group consisting of synthetic fibers, glass fibers, natural fibers, cellulose and carbon fibers is mixed and adhered to be molded into a non-woven fabric product, and further, optionally a fixed base is formulated into said non-woven fabric product.

25. A composition according to claim 2, which is shaped as a non-woven fabric, wherein the co-existing product in which the reaction product of at least one metal selected from the group consisting of iron, manganese, chromium, nickel, zinc, aluminum, copper, tin and cobalt with at least one acid selected from ascorbic acid, citric acid, tartaric acid and gluconic acid coexists with unreacted said metal shaped as a powder, foil or fiber is prepared, a solid base is formulated in the co-existing product and is then mixed and adhered with at least one fiber selected from the group consisting of synthetic fibers, glass fibers, natural fibers, cellulose and carbon fibers to be formed into a non-woven fabric shape.

26. A composition according to claim 2, which is shaped as a non-woven fabric, wherein at least one member selected from powder, foil and fiber of at least one metal selected from iron, manganese, chromium, nickel, zinc, aluminum, copper, tin and cobalt and at least one fiber selected from the group consisting of synthetic fibers, glass fibers, natural fibers, cellulose and carbon fibers are mixed and adhered to form a non-woven fabric, at least one acid selected from ascorbic acid, citric acid, tartaric acid and gluconic acid is attached by coating onto said non-woven fabric, and optionally, a solid base is formulated therein.

* * * * *